(12) United States Patent
Lu

(10) Patent No.: US 7,619,368 B2
(45) Date of Patent: Nov. 17, 2009

(54) POWER SOURCE APPARATUS

(76) Inventor: Chao-Cheng Lu, 4-4, Alley 27, Lane 143, Chun Kung Road, Taipei 11614 (TW)

( * ) Notice: Subject to any disclaimer, the term of this patent is extended or adjusted under 35 U.S.C. 154(b) by 599 days.

(21) Appl. No.: 11/175,349

(22) Filed: Jul. 5, 2005

(65) Prior Publication Data

US 2007/0007902 A1 Jan. 11, 2007

(51) Int. Cl.
*H05B 39/04* (2006.01)
*H05B 37/00* (2006.01)

(52) U.S. Cl. .................................. 315/209 R; 315/312

(58) Field of Classification Search ............ 315/209 R, 315/247, 276, 291, 307, 312, 200 R, 257, 315/279
See application file for complete search history.

(56) References Cited

U.S. PATENT DOCUMENTS 5,666,279 A * 9/1997 Takehara et al. ............... 363/95
5,818,709 A * 10/1998 Takehara ...................... 363/95
7,332,871 B2 * 2/2008 Lu ............................ 315/247

* cited by examiner

*Primary Examiner*—Douglas W Owens
*Assistant Examiner*—Minh D A
(74) *Attorney, Agent, or Firm*—Jacobson Holman PLLC

(57) ABSTRACT

A power source apparatus is disclosed in this invention, specifically a power source apparatus comprising a voltage amplitude control unit that employs an active power factor corrector to control the output DC voltage by applying positive or negative logic control voltage, incorporated with high frequency power source circuit and high frequency transformer, brightness of Cold Cathode Fluorescent Lamp (CCFL) or External Electrode Fluorescent Lamp (EEFL) are controllable and DC power is directly applied to DC load. Such method is accomplished by adjusting the amplitude of the supplying DC voltage for controlling the amplitude of the high frequency voltage of CCFL or EEFL, thus called Voltage Amplitude Method. Because of the characteristics of stable frequency, high resolution and linearity, VAM is broadly used in the control of luminance of discharge tubes, such as TFT-LCD TVs, LCD monitors and advertisement lamps. The impulse width controller of the present invention achieves the luminance control of CCFL or EEFL inside or outside the glow discharge zone.

46 Claims, 20 Drawing Sheets

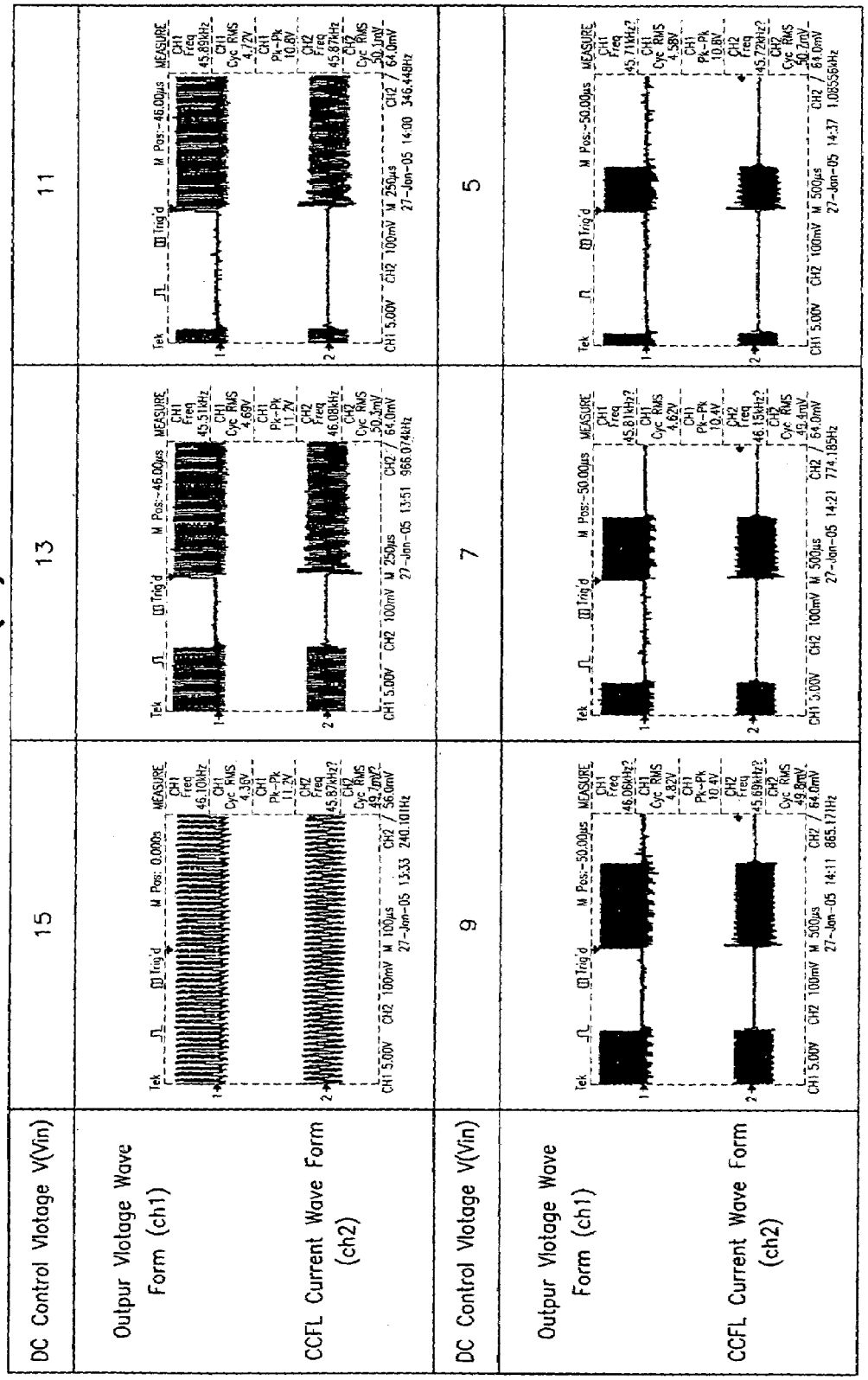

POWER SOURCE APPARATUS

BACKGROUND OF THE INVENTION

This Invention is a dimming adjustable discharge lamps power source device with voltage amplitude control function which is controlled by a positive or negative logic control, the high frequency transformer of the circuit gives high voltage power source and the multiple secondary winding of the transformer give stable DC power source supply, protection, over current, over voltage, and etc. function through rectify, filtering, voltage regulator, and etc. devices, above embodiment is applied in TFT LCD TV, LCD monitor, LCD TV Wall, LCD brightness control, power of PDP TV, and DC power source supply and secures safety.

The brightness control of Cold Cathode Fluorescent Lamp, CCFL, External Electrode Fluorescent Lighting, EEFL used to be Pulse Frequency Modulation, PAM, or Pulse Width Modulation, PWM methods to achieve CCFL, EEFL lamps group dimming control, the disadvantage of these methods are, 1. PFM, the amplitude is fixed, the frequency is variable, and the variable frequency causes lot of noise interference.
2. PWM, The frequency is fixed, the width of the pulse is variable, the method makes hum noise and it used to be applied to low voltage application, such as Inverter.

This Invention has a fixed frequency and pulse width; by adjust the amplitude of DC Voltage to achieve brightness control, moreover it provides stable DC power source supply to system to solve above disadvantage of PAM and PWM.

The first purpose of this Invention is to give CCFL, EEFL lamps group a fixed frequency and pulses width power source.

The second purpose of this Invention is to provide a (Voltage Amplitude Method, VAM) method to solve the noise, hum, and high cost of PWM and PAM methods.

The third purpose of this Invention is to provide brightness control to discharge lamps of TFT LCD TV, LCD Monitor, LCD TV Wall, PDP TV, and etc monitors.

The forth purpose of this Invention is to provide a (Voltage Amplitude Method, VAM) method to generate a variable DC power source supply to give other application in system.

The fifth purpose of this Invention is to provide a high frequency and high wattage output which is couple from a half bridge oscillation driver, one or multi-sets of MOSFETs, one or more output high frequency transformers to match power requirement of TFT LCD TV, LCD Monitor, LCD TV Wall, PDP TV, and etc monitors.

The sixth purpose of this Invention is to provide an impulse width control circuit to control brightness of a CCFL and EEFL lamps group in or out of the glow zone and DC voltage control of the DC power source supply.

The seventh purse of this Invention is to offer better circuit to prove this embodiment.

SUMMARY OF THE INVENTION

1. A DC voltage output of Active Power Factor Corrector (APFC) controlled by positive or negative logic voltage, the control coupling method can be an opto-coupling or a direct coupling.
2. A high frequency high power output circuit includes a high frequency oscillation and driving circuit providing the primary winding of the high frequency transformer, the circuit can be a self oscillating half bridge driver IC circuit or a self oscillating full bridge driver IC circuit depended on the requirement of the CCFL or EEFL lamps group.
3. A High Frequency High Power Output Circuit, HFHPOC, is a self oscillating half bridge driver, multiple sets of MOSFET, and one or a plurality of high frequency transformer to enhance the output of the circuit.
4. An impulse width control circuit is composed by pulse width control circuit and photo coupler, the circuit controls the oscillating coefficient capacitor or output pulse width of the driver circuit of the HFHPOC to give brightness control to CCFL and EEFL lamps group in or out of the glow zone and output voltage adjusting of the DC power source.
5. A high frequency transformer contains primary winding and multi sets of secondary winding; the secondary winding contains a high frequency high power source to give the requirement of the CCFL and EEFL lamps group, the multiple sets of secondary winding give different DC voltage to system.
6. CCFL and EEFL lamps group are controlled by the high frequency high power source of the secondary winding of the high frequency transformer, an open circuit sensor circuit is connected to each lamp to ensure the quality of backlight.
7. Each one of the DC source output of the secondary winding of the high frequency transformer contains rectifier, filtering, regulation, over current protection, over voltage protection circuit.
8. The DC source of the protection circuit gets from DC power source, the protection circuit works when in the open circuit status, over voltage of CCFL and EEFL lamps group, over current, over voltage of DC power source.
9. The I/O interface device contains one or multi inputs to control the luminance dimming of CCFL, EEFL lamps group and DC source.

DETAILED DESCRIPTION OF THE INVENTION

Figure 1:
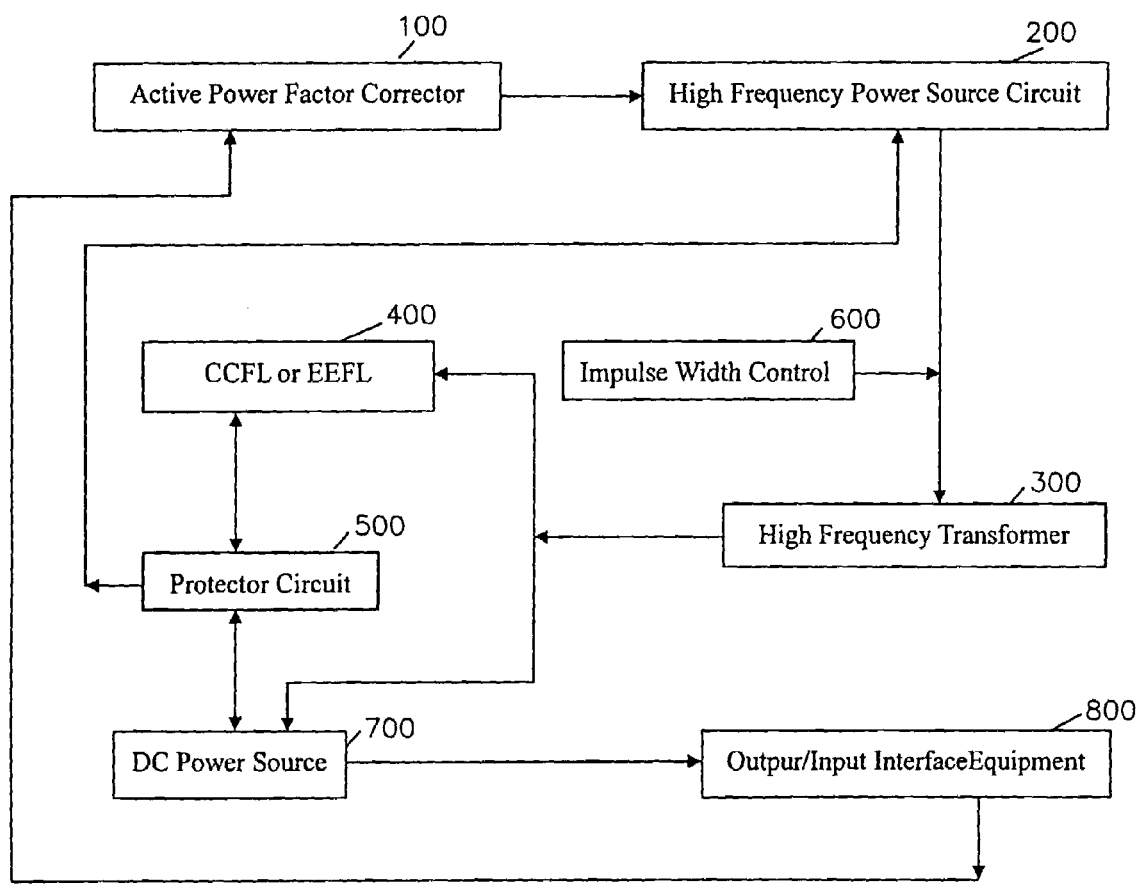
FIG. 1, the block diagram of a VAM power device.

As shown in FIG. 1, the block diagram of a VAM power device includes, Active Power Factor Corrector, APFC 100, high frequency power source circuit 200, High Frequency Transformer 300, CCFL or EEFL lamps group 400, Protector Circuit 500, impulse width control 600, DC power source 700, Output/Input Interface Equipment 800.

Figure 2:
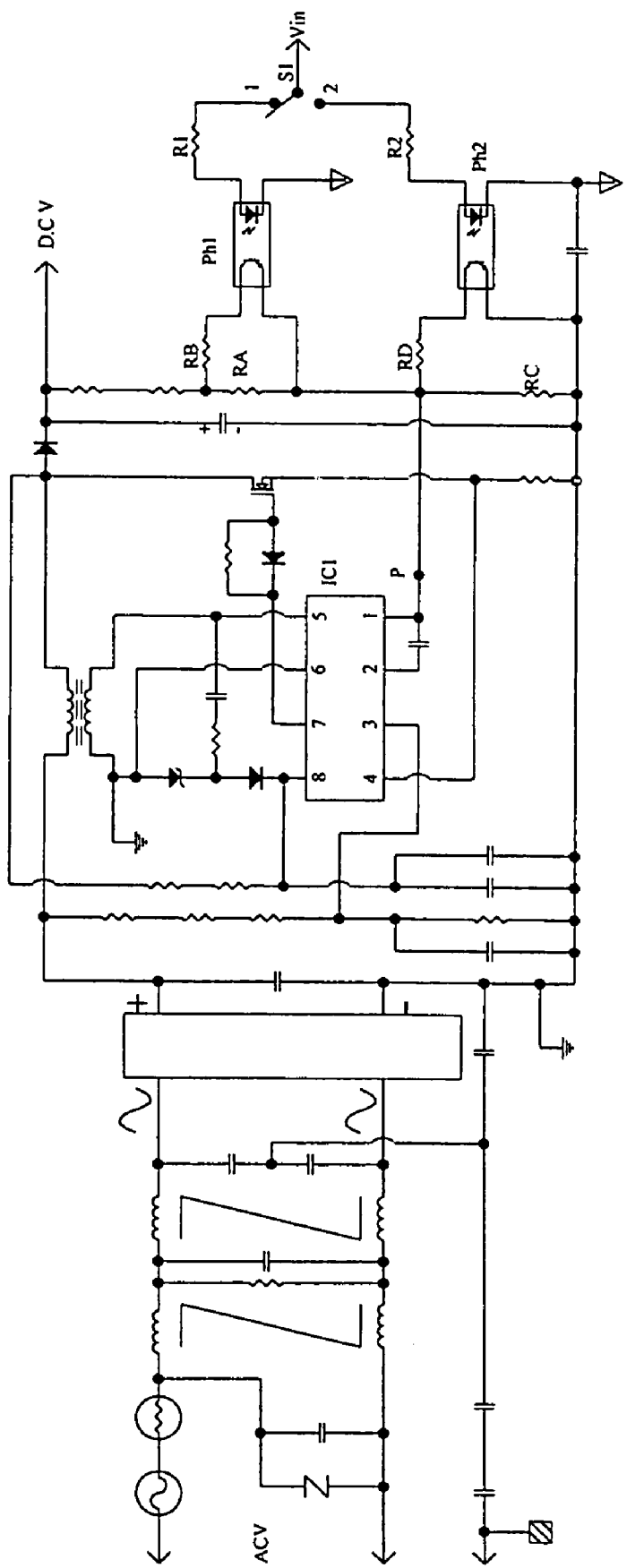
FIG. 2, an embodiment of APFC circuit.

As shown in FIG. 2, an embodiment of APFC circuit, 100, of this Invention. An Electro-Magnetic Interference Filter, EMIF, is connected to AC source, the IC1 is an APFC IC, and pin 1, P, is a voltage feedback. The rating of the feedback voltage is different by different IC. For example, the feedback voltage of TDA4862 is 2.5V. When the output voltage, DC V, is fixed, the rating of RA is decreased, the voltage of P is increased, and thus the DC V is decreased. To approach the purpose, a RB and a Photo Coupler Ph1 is applied in this embodiment. RB and output part of Ph1 is connected in serial and paralleled to RA. When switch S1 is switched to 1, the LED part of Ph1 is most lit when the Vin is a high voltage, therefore; the equipotent resistance of RA and RB is lowest, and the voltage of DC V is lowest. Conversely when the Vin is a low voltage, the voltage of Vin is highest. The Vin and DC V is an inverse ratio. When S1 is switched to 2, the LED part of Ph2 is most lit when the Vin is a high voltage, therefore; the equipotent resistance of RC and RD is lowest, and the voltage of DC V is highest. Conversely when the Vin is a low voltage, the voltage of Vin is lowest. The Vin and DC V is a direct proportion. Thus, the input characteristic of Ph1 and Ph2 is an important coefficient of the range of Vin. The range of Vin can be wide and digital controllable with combination of R1 and R2. The output part of Ph1 and Ph2 can be photosensitive or other function type and, but should not be limited.

Figure 3:
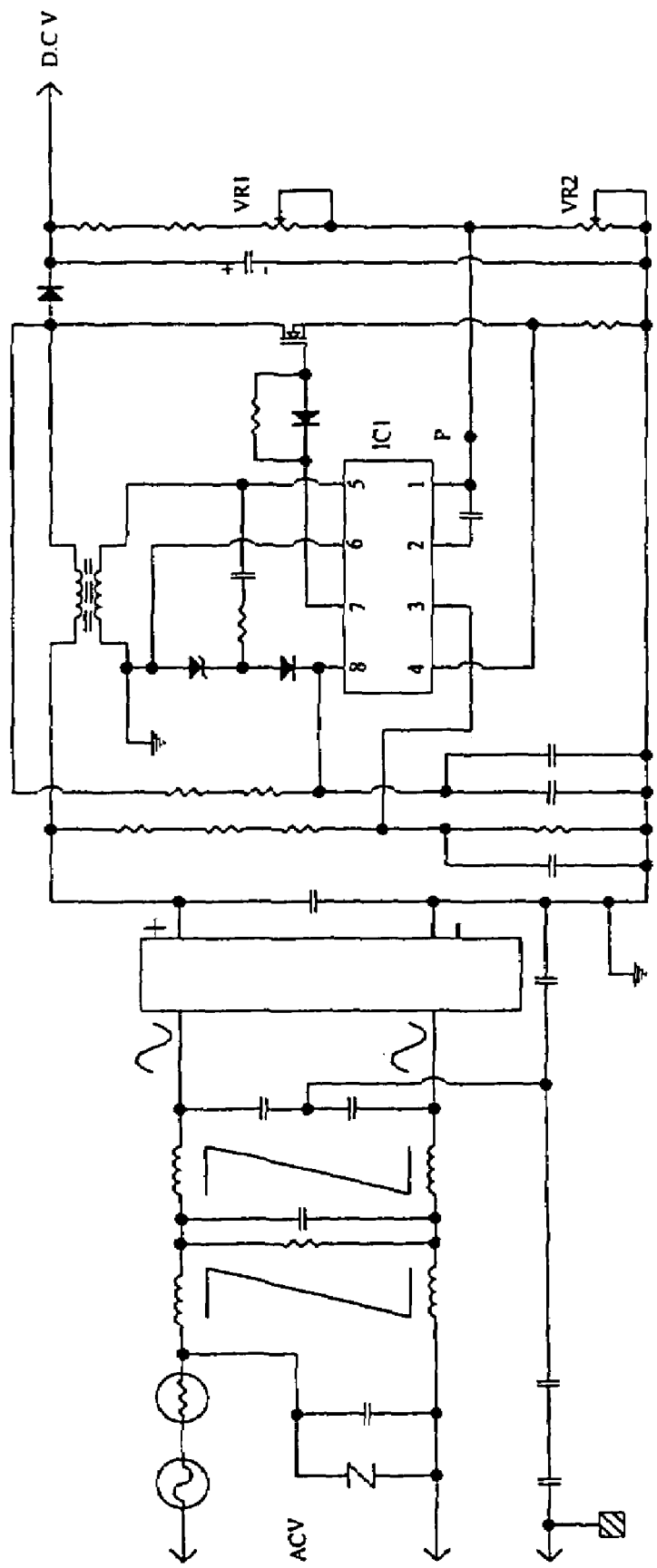
FIG. 3, an embodiment of APFC circuit.

As shown in FIG. 3, is the other embodiment of APFC circuit, 100, of this Invention. Instead of Ph1 and Ph2, the RA and RC can be replaced by variable resistor, VR1 and VR2. The DC V can be adjusted manually.

Figure 4:
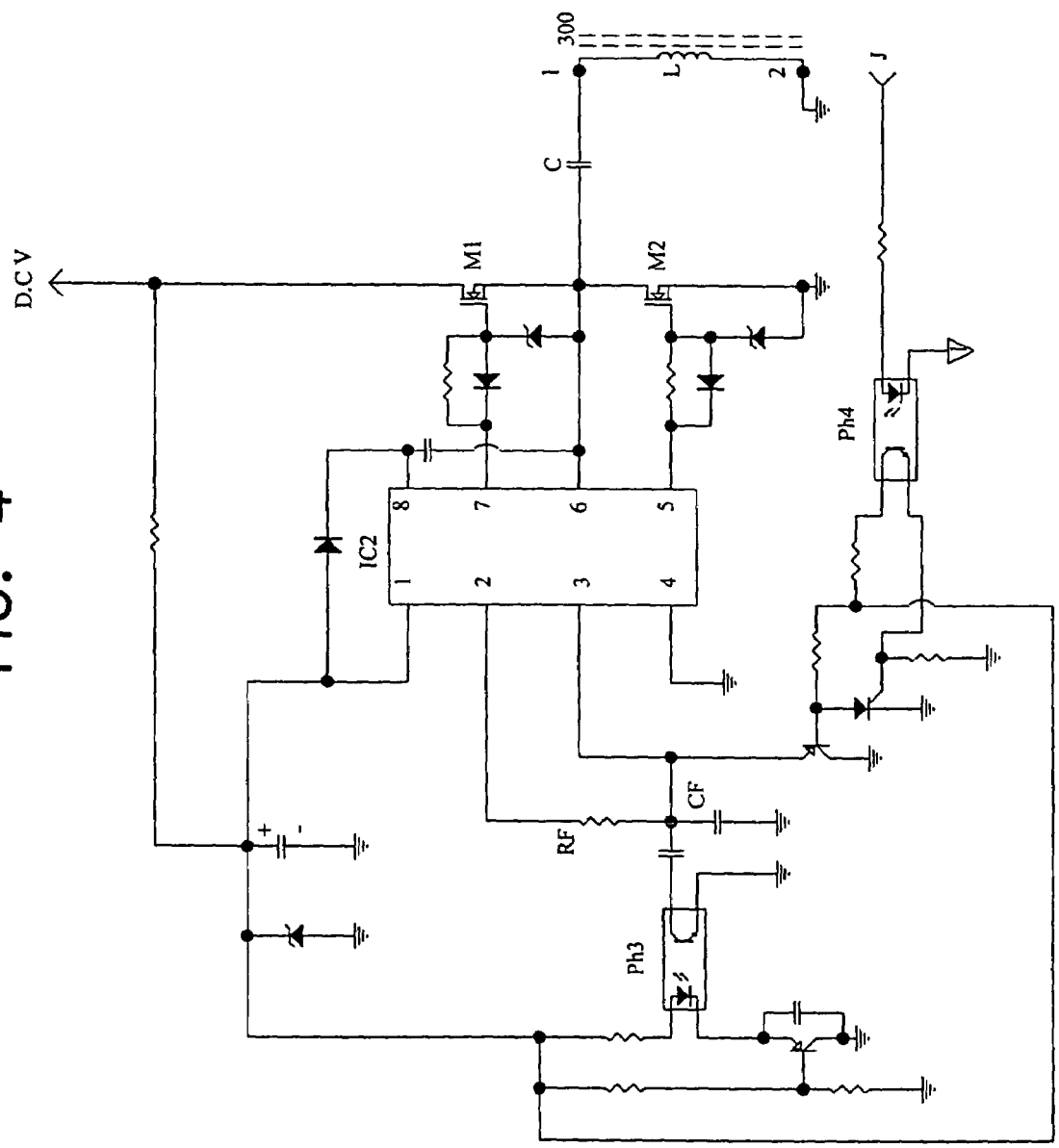
FIG. 4, an embodiment of high frequency power source circuit.

As shown in FIG. 4, is an embodiment of high frequency power source circuit, 200. IC2 is a self oscillating half bridge driver such as IR2153, IR2155, MC34066, uC1864, and etc. The oscillating frequency is depended on the resistor RF; capacitor CF. A photo coupler Ph3, an ignition circuit, gives CCFL, and EEFL lamps group enough ignition energy. A photo coupler Ph4, a protector circuit, works when open-circuited, over current, and over voltage occurs on CCFL, and EEFL lamps group 400 or DC power source 700. The LED part of Ph4 is lit, the IC2 stop working. The pin 5 and 7 of IC2 sends pulses to drive Power MOSFET, M1 and M2. One set of Power MOSFET M1 and M2 connected to the connection 1 and 2 of the primary winding of High Frequency Transformer, 300, in half-bridge wiring. The harmonic frequency is depended on capacitor C and inductor L. The frequency of IC2 is fixed, and not variable with load.

Figure 5:
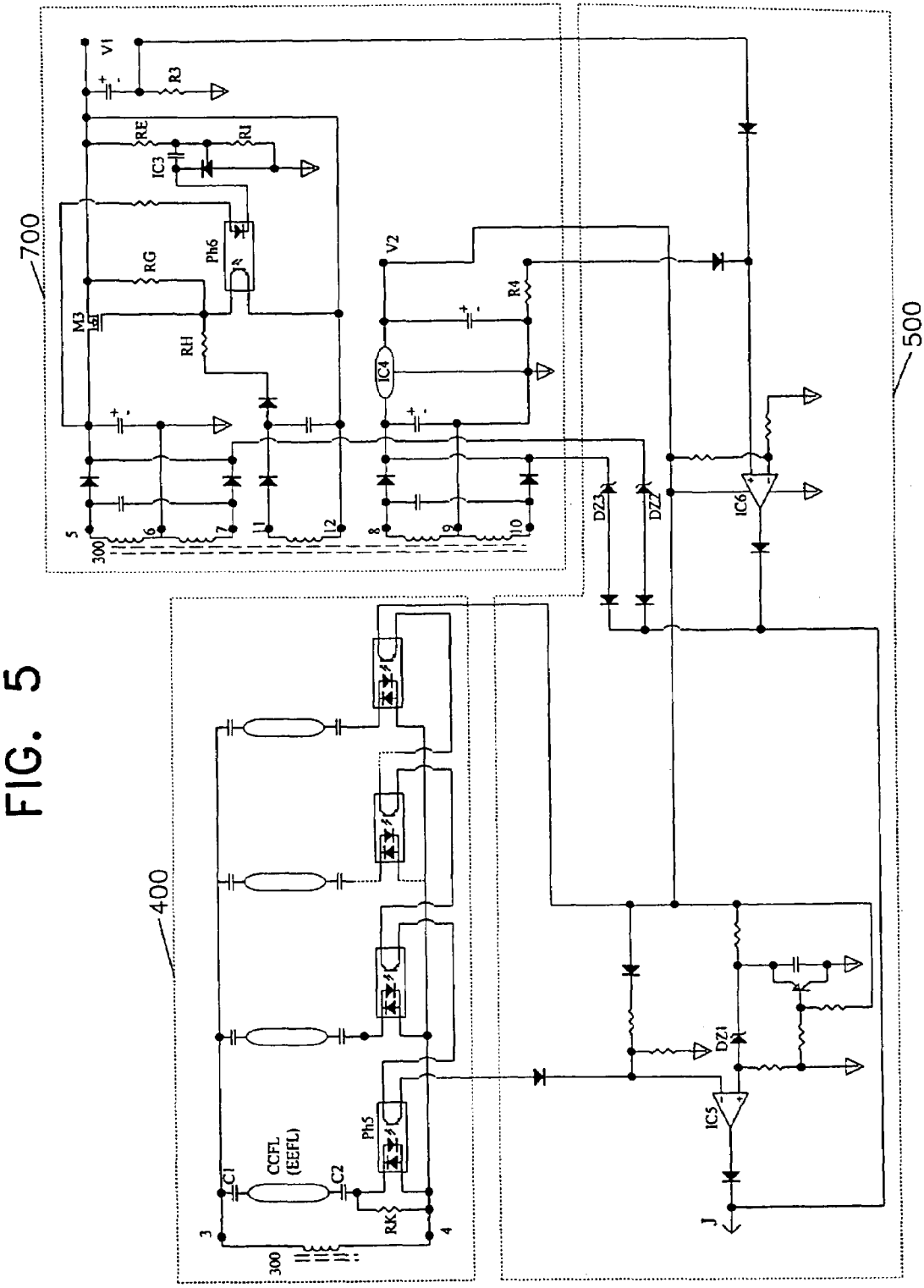
FIG. 5, an embodiment of CCFL or EEFL lamps group, DC power source, and Protector Circuit.

As shown in FIG. 5, an embodiment of CCFL or EEFL lamps group 400, Protector Circuit 500, DC power source 700. The connection 3 and 4 of the first secondary winding of High Frequency Transformer 300 is a high frequency power source circuit of CCFL or EEFL lamps group. Each CCFL or EEFL connects to high frequency capacitor C1, C2, and a protecting detection circuit. When one or more than one CCFL or EEFL act open circuited, the signal sent to Protector Circuit is a zero voltage; thus the Protector Circuit 500 works. Ph5 is an AC Input Response Photo Coupler. A RK is connected to input part of Ph5 in parallel to prevent from over current occurred on input part of AC Input Response Photo Coupler. The connection 5, 6, and 7 of the second secondary winding of the High Frequency Transformer 300, the connection 8, 9, and 10 of the third secondary winding of the High Frequency Transformer 300, the connection 11, and 12 of the fourth secondary winding the of High Frequency Transformer 300 are supplementary power sources. A full-wave rectifier, a π type filter, and a Programmable Precision References IC, IC3, are connected to the second secondary of the high frequency transformer 300. A photo coupler Ph6 is used for isolation between the second secondary winding and the fourth secondary winding to achieve the purpose of regulation. Re and RI are for the reference voltage adjusting for IC3. RG and RH are used for dividing voltage from supplementary power source. A full-wave rectifier, a π type filter, and a three terminal voltage regulator, IC4 are connected to the third secondary winding of high frequency transformer 300. A half wave rectifier is connected to the fourth secondary winding of the high frequency transformer 300. The DC voltage V1 and V2 are the output voltage of the second and the third secondary winding of high frequency transformer 300. The forth secondary winding is independent power source; the function is to execute the regulation of V1. The rectifier, filter, and regulator circuit can be varied and depended on application. Protector Circuit, 500, is composed by OP Amp IC, IC5 and IC6. IC5 detects CCFL or EEFL lamps group 400. A delay circuit is composed by ZD1. The delay circuit makes sure the protector signal is taken from stable CCFL or EEFL lamps. IC6 detects over current and over voltage of V1 and V2. The over voltage detection device of V1 is Zener diode DZ2, the over current detection device is resistor R3. The over voltage detection device of V2 is Zener diode DZ3, the over current detection device is resistor R4. The output of IC5 and IC6 connect to connection J, also connected to J connection of high frequency power source circuit 200. IC5 and IC6 can be two different parts in one IC.

Figure 6:
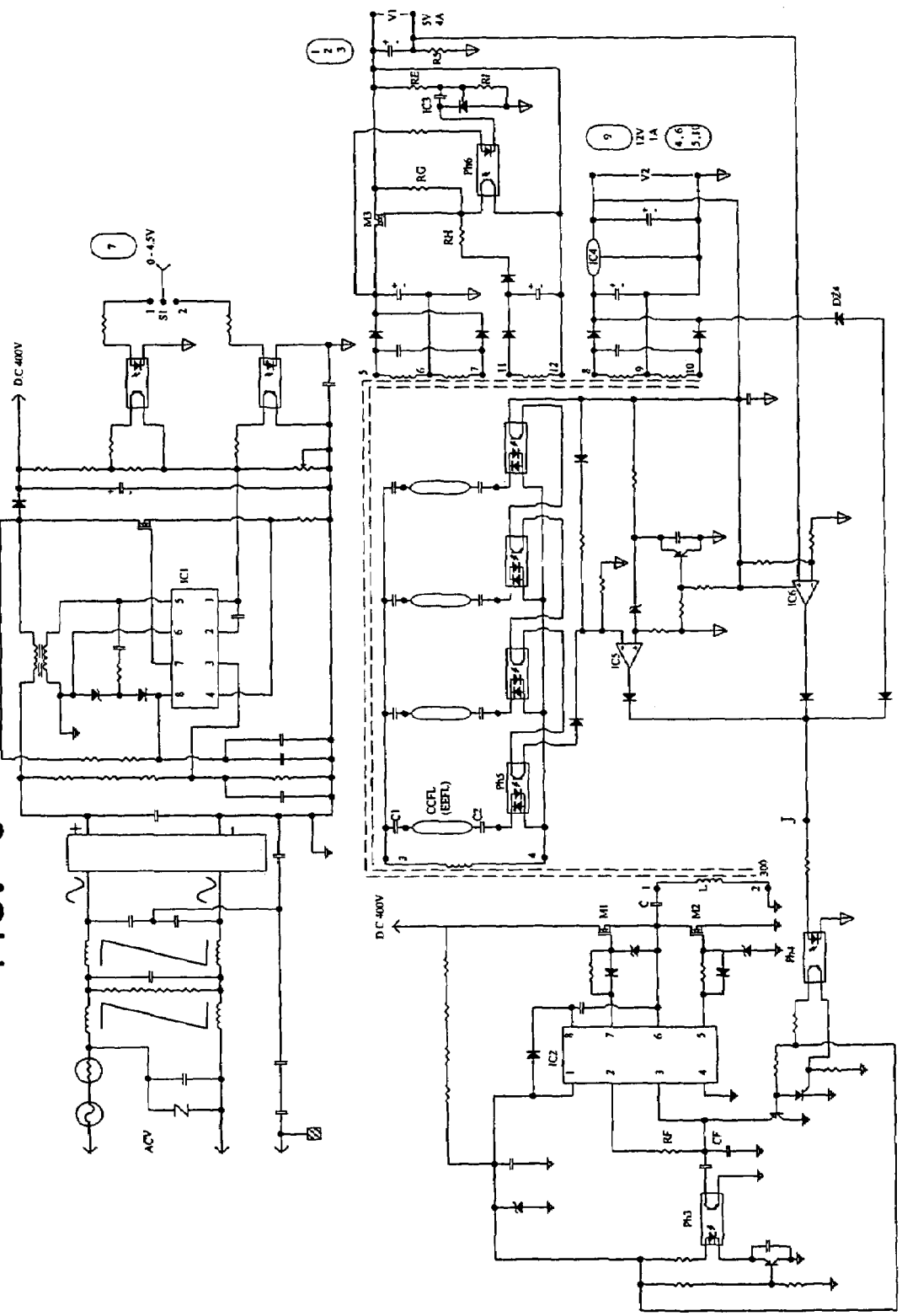
FIG. 6, an embodiment of VAM power system.

As shown in FIG. 6, is an embodiment example of VAM power system. Physically it is the same structure as FIG. 2, FIG. 4, and FIG. 5 except symbols. The only difference is that the connection 11 and 12 of the fourth secondary winding of the high frequency transformer 300 is an independent power source. The purpose of the circuit is to give a stable voltage output to DC voltage output of the second secondary winding of high frequency transformer 300. When the V1 is low, the LED part of IC6 is not lit, the MOSFET M3 is on, and a setting voltage can be measured at V1. If the V1 is greater than setting, the M3 is off, and the V1 is lower, therefore, V1 is a very stable voltage output. IC3 is a Programmable Precision References IC. R5 is an over current detection resistor. The I/O Interface 800 includes 5V DC voltage output, connection 1, 2, and 3; 12V DC voltage output connection 9; ground connection 4, 5, 6, and 10; the input connection, connection 7 is a lamination dimming control signal input, usually from 0 to 4.5VDC or 0 to 5VDC depended on system.

Figure 7:
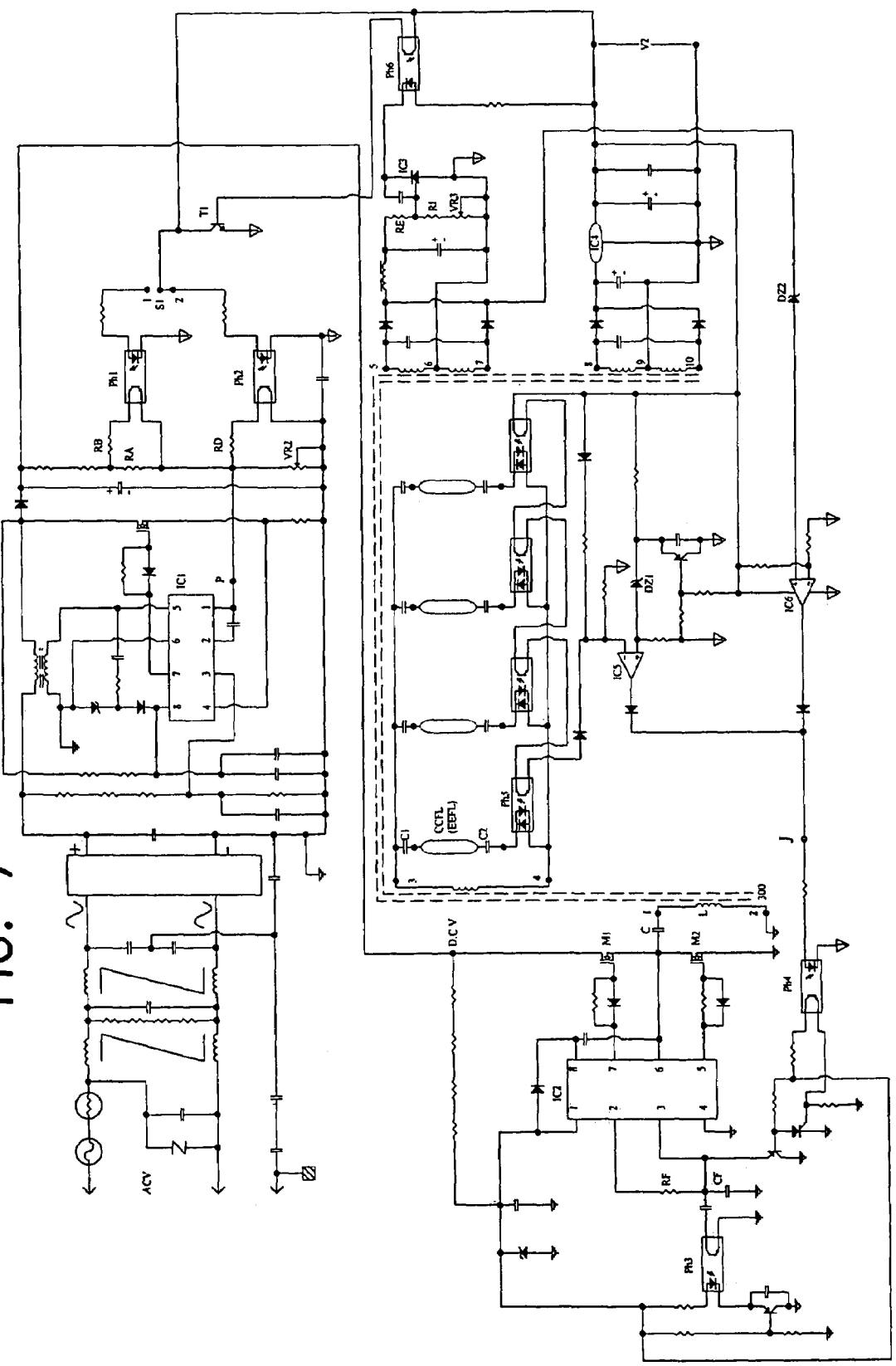
FIG. 7, an embodiment of VAM power system.

As shown in FIG. 7, is an embodiment example of VAM power system. The DC voltage output of APFC 100 is controlled by Programmable Precision References IC, IC3, of the second secondary winding, connection 5, 6, and 7, of high frequency transformer 300. By adjusting the DC voltage output of APFC to control the luminance of CCFL or EEFL lamps group. The first secondary winding, connection 3, 4, and the second secondary winding connection 5, 6, and 7, belong to a same high frequency transformer 300, therefore; the second secondary winding reacts the RMS voltage of the first secondary winding. The other function is as same as pervious embodiment examples. The control logic can be negative or positive logic control depended on the requirement and the characteristics of the CCFL or EEFL lamps group and, but should not be limited to this embodiment.

Figure 8:
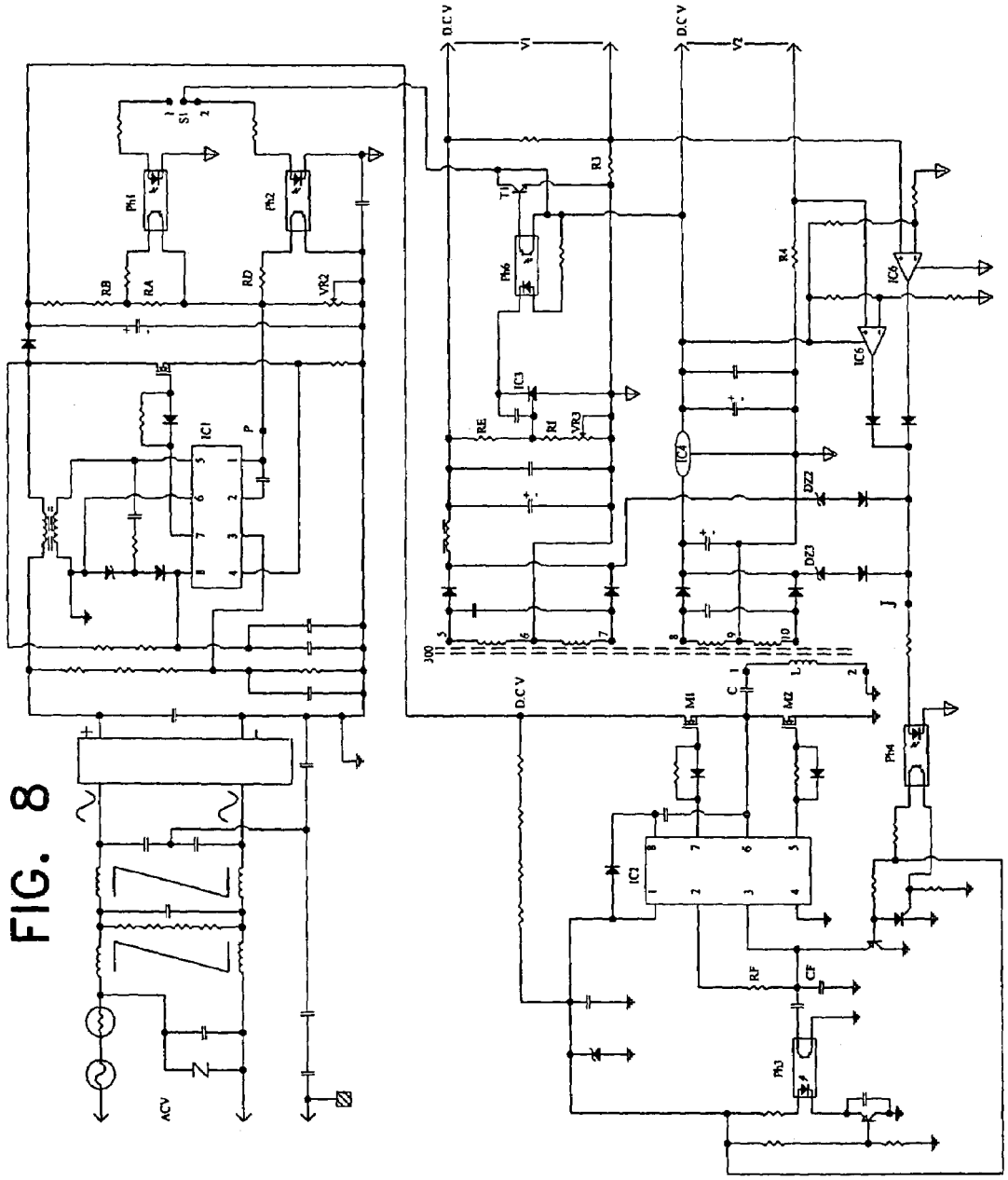
FIG. 8, an embodiment of VAM power system.

As shown in FIG. 8, is an embodiment example of VAM power system. The DC voltage output of the second secondary winding of high frequency transformer 300, connection 5, 6, and 7, is controlled by a reference voltage control variable resistor, VR3, of Programmable Precision References IC, IC 3. When the V1 is smaller than setting voltage, Ph1 gets a positive voltage, therefore, the DC voltage output of the APFC 100 gains, V1 gains to setting voltage as well. The third secondary winding of high frequency transformer 300, connection 8, 9, and 10, supplies V2 to load as well. The other function is as same as pervious embodiment examples.

Figure 9C:
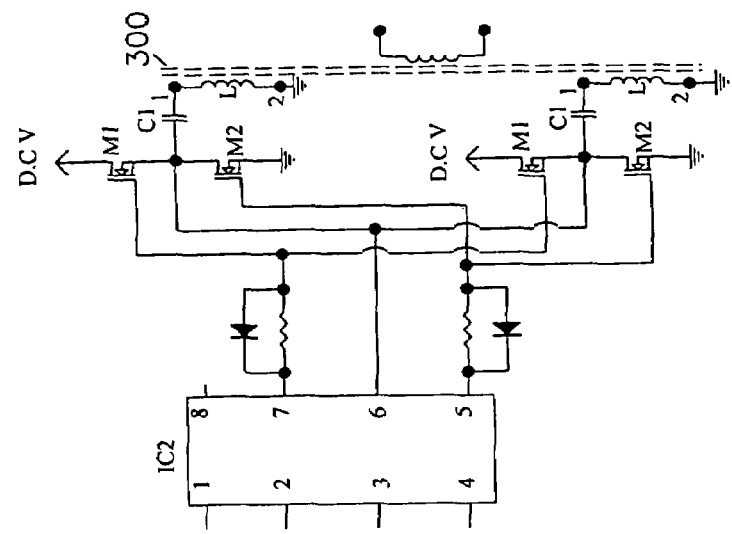
FIG. 9, an embodiment of VAM power system.
Figure 9B:
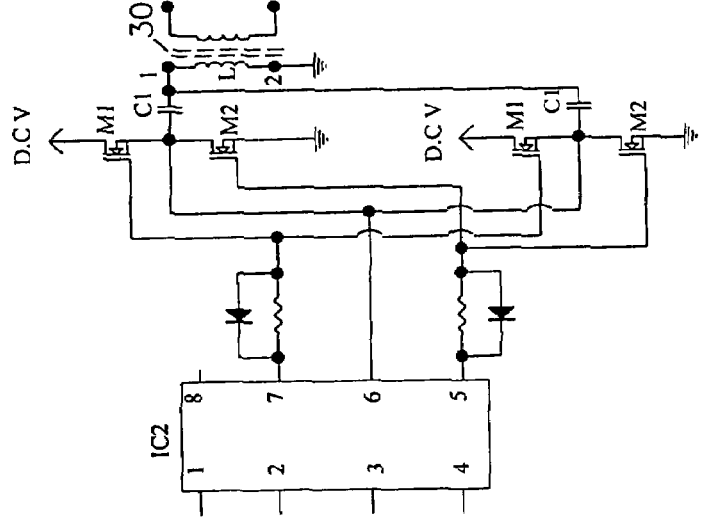
Figure 9A:
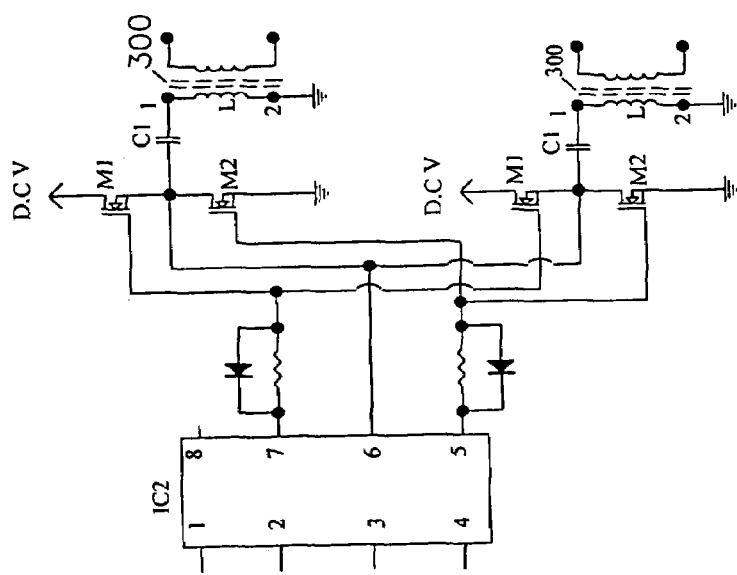

As shown in FIG. 9, is an embodiment example of VAM power system. FIG. 9 (A) is the combination of the two sets of MOSFET in the FIG. 6, FIG. 7, and FIG. 8 so as to gain the output of the high frequency power source circuit 200. The purpose is to diffuse the heat dissipation and to reduce the thickness within same output. There is only one driver IC, IC2, applied in circuit to synchronize the two sets of MOSFET. FIG. 9 (B) replaces the two high frequency transformer 300 with one high frequency transformer 300 to cut the cost. The sets of the MOSFET can be multiple and, but should not be limited to this embodiment. FIG. 9 (C) shown the connection 1 and 2 of the primary of the high frequency transformer 300, shown in FIG. 9 (A), connect to the high frequency transformer 300 to reduce the heat dissipation. That is, the high frequency power source circuit can be s self oscillating full bridge driver and, but should not be limited to this embodiment. The MOSFET can be replaced with IGBT or other power transistor device and, but should not be limited to this embodiment.

Figure 10:
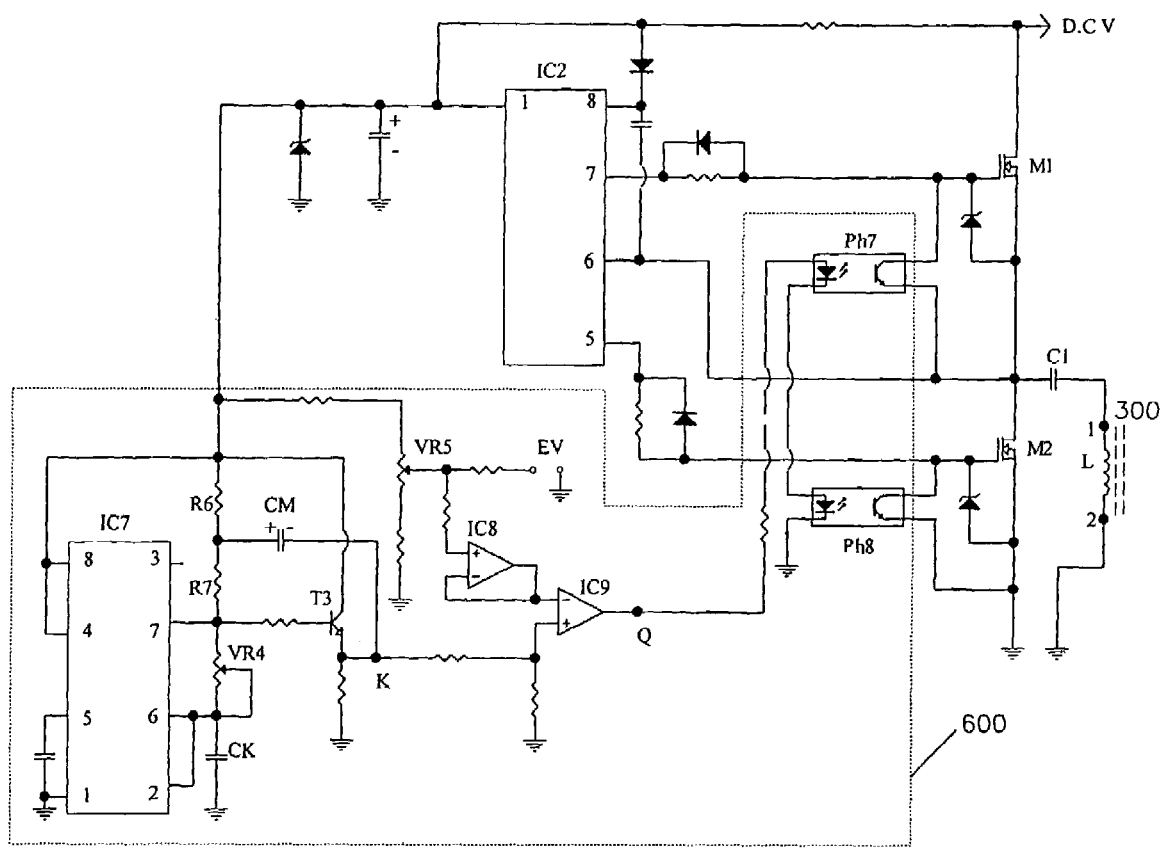
FIG. 10, an embodiment of impulse width control circuit.

As shown in FIG. 10, is an embodiment of impulse width control circuit. The outputs, the connection 5 and 7, of the PFMIC respectively send pulses to the Gate Terminals of M1 and M2. The Gate Terminals of M1 and M2 respectively connect to the output of the Photo couplers, Ph7 and Ph8, shown in FIG. 4. A Timer IC, IC7, such as combining with the 555 and the transistor T3 to form a Sawtooth Generator. The Sawtooth wave of the Sawtooth Generator from K sending to the positive input of the OP Amp IC9. The frequency of the Sawtooth wave is $f=1/CK [0.75(R6+R7)+0.693*VR4]$; the value of R6*CM has to greater than 10*R7*CK. The Sawtooth Generator can be other sawtooth generator IC, but should not be limited to this embodiment. The output of DC Summing Amplifier IC, IC 8, and DC voltage is connected to the negative input of the IC 9. The voltages of positive input of IC 8 come from DC voltage and External Control Voltage, EV. The negative input of the IC 9 is a DC voltage; the positive input of IC 9 is sawtooth wave; therefore, a pulse is generated at the output of IC9, Q, and the frequency of it is controlled by VR4. The output of the IC9, Q, is connected to input part of Ph7 and Ph8; the output part of Ph7 and Ph8 is connected to Gates of M1 and M2. When the negative input of the IC9 is large, the pulse width is narrow; therefore, the output of the high frequency transformer 300 is enlarged. Contrariwise, the output of the high frequency transformer 300 is lessened. To approach the brightness control or CCFL or EEFL lamps group, the same function IC can be applied to replace this circuit and, but should not be limited. The impulse width control circuit can be applied on the brightness control of other discharge lamps, such as High Pressure Sodium Lamp, HID Lamp, and etc. lamps.

Figure 11A:
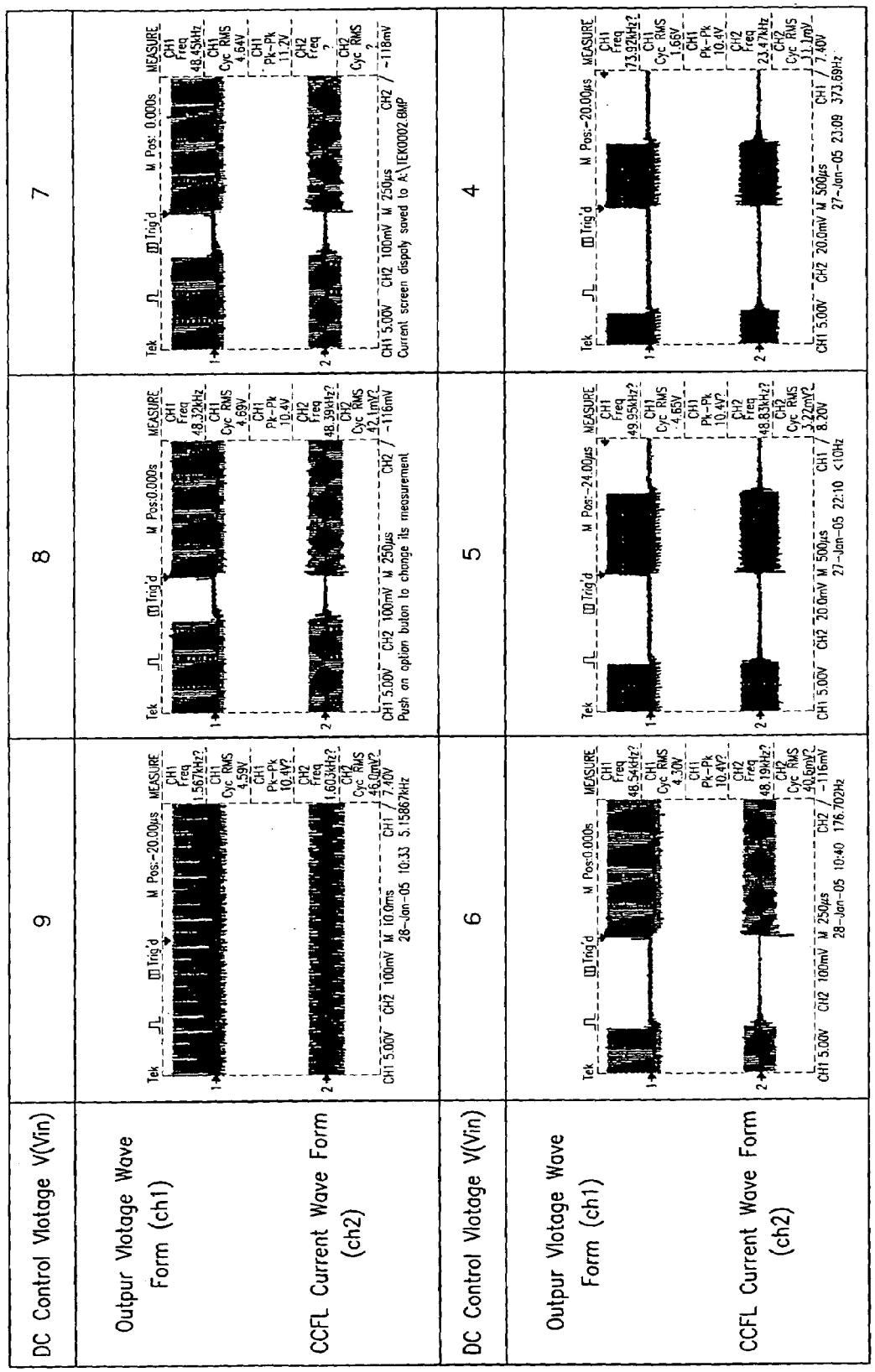
FIG. 11, a wave-form measurement of 4 CCFL lamps applied on FIG. 10.
Figure 11B:
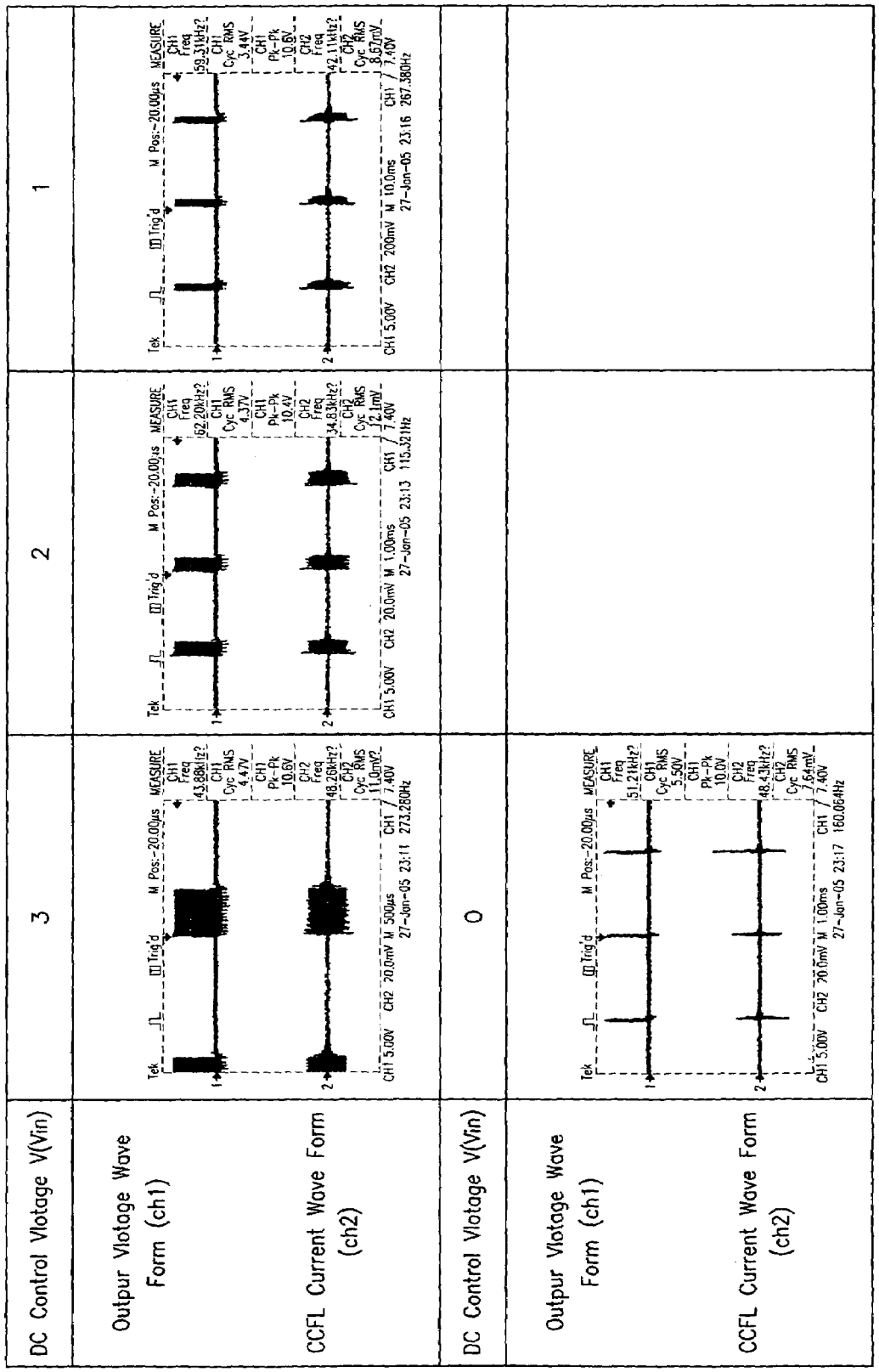

As shown in FIG. 11, a real wave-form measurement from Ph8 in FIG. 10, the measurement makes from only one photo coupler, Ph8. The photo coupler Ph7 and Ph8 can be applied only one or both of them, depended on the situation. The Vin, the output, and the wave-form of the lamp are for reference and proving of this embodiment.

Figure 12:
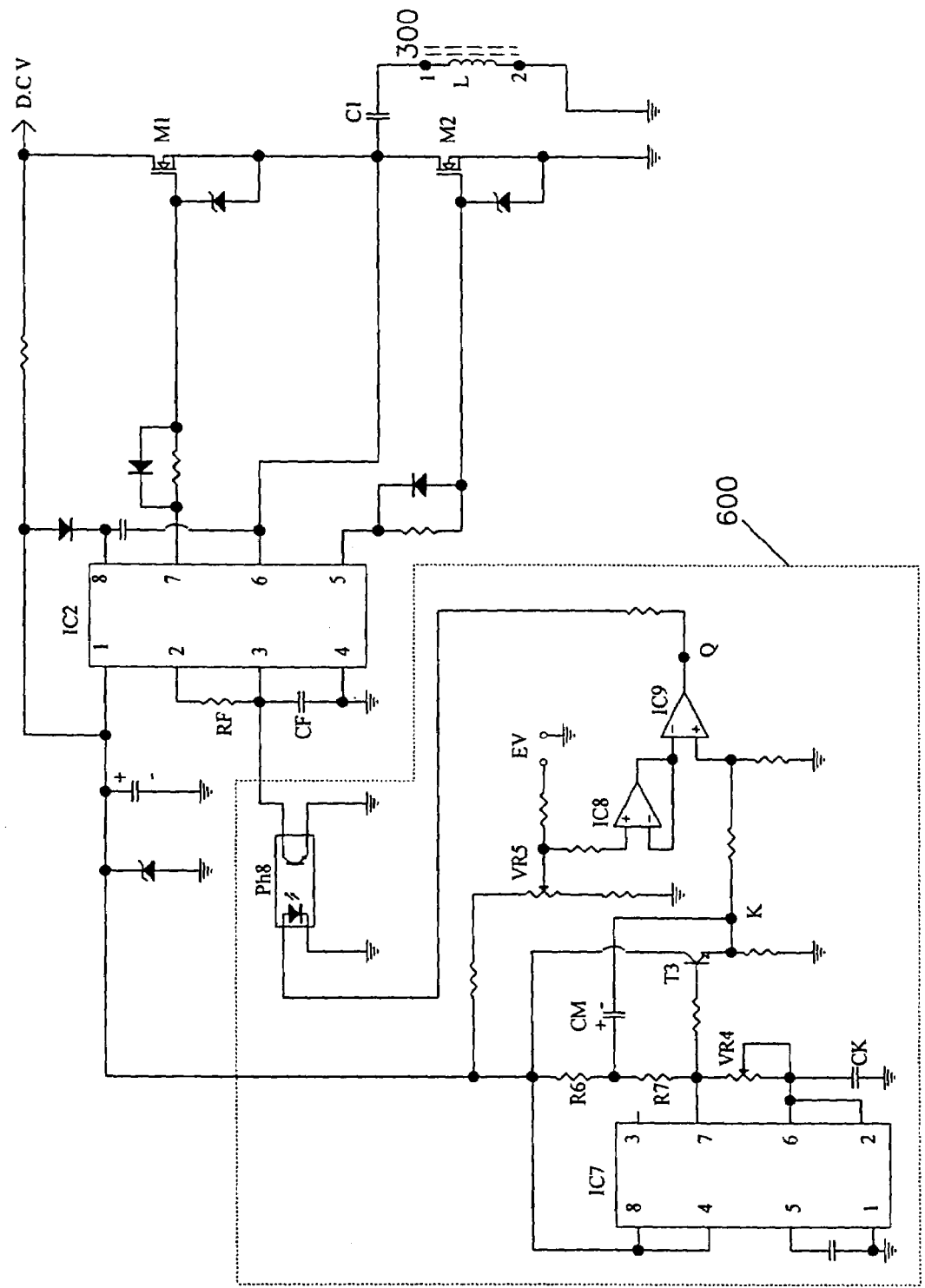
FIG. 12, an embodiment of impulse width control circuit.

As shown in FIG. 12, is an embodiment of impulse width control circuit. The output of Ph8 is moved to the oscillation relation capacitor CF in parallel. The Input stays the same connection. The output frequency of IC9 equals to the Shutdown time of the IC2 to reach a purpose of brightness control of CCFL or EEFL lamps group. The width and frequency of output pulse of IC9 is variable and depended on application.

Figure 13B:
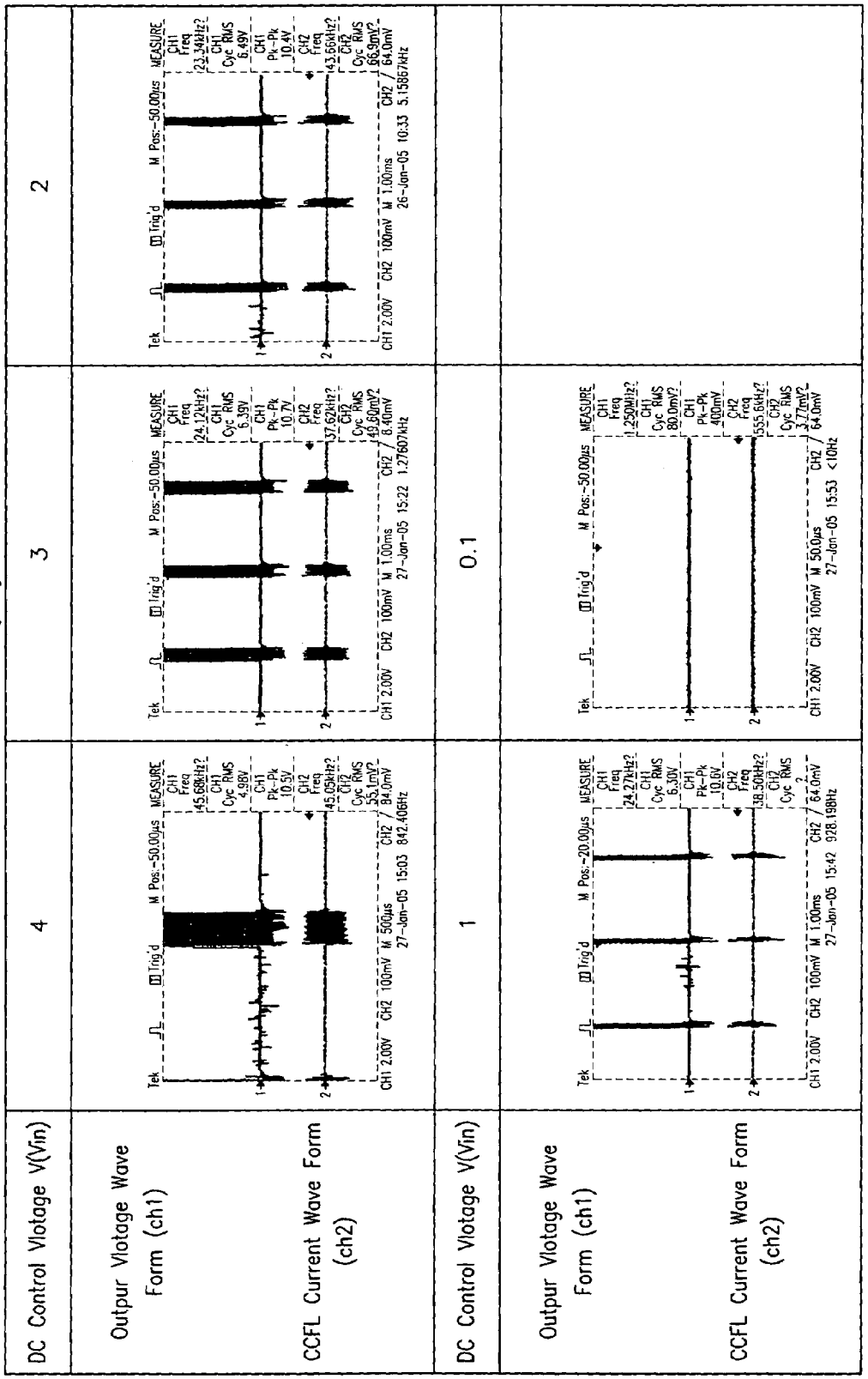
FIG. 13, a wave-form measurement of 4 CCFL lamps applied on FIG. 12.

As shown in FIG. 13, is a wave-form measurement of 4 CCFL lamps applied on FIG. 12. There is only one photo coupler Ph8 is applied. Vin is voltage of EV in FIG. 12; the range is from 0 to 15V. The wave-form of voltage of control output, Ch1, Lamp current, Ch2, Vin, and the output are for reference and proving of this embodiment.

Figure 14:
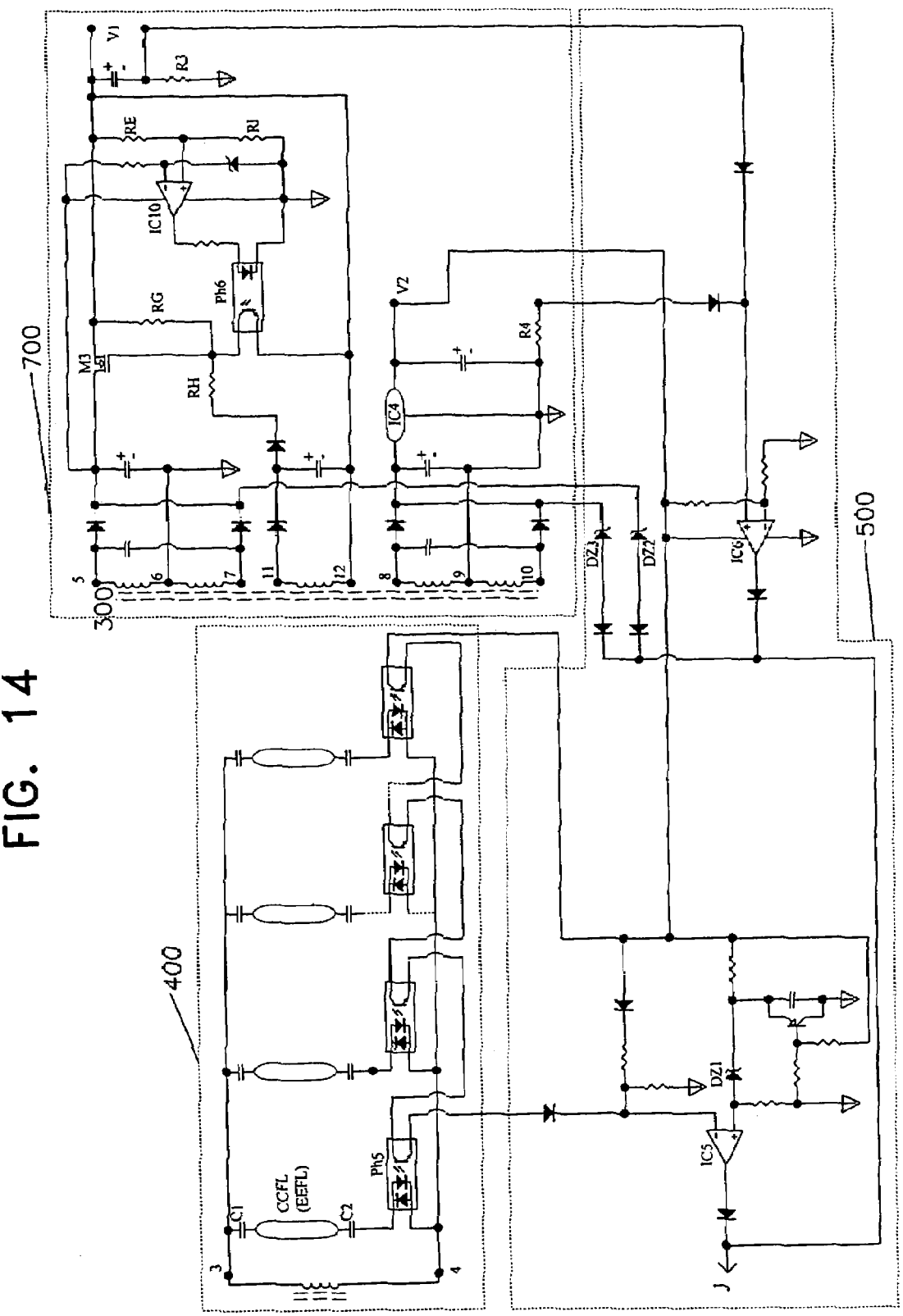
FIG. 14, an embodiment of DC power source circuit.

As shown in FIG. 14, is an embodiment of DC power source circuit. The Programmable Precision References IC is replaced by IC 10, OP Amp, in FIG. 5 of DC power source circuit 700. When the positive input voltage is greater than negative input voltage, a positive is sent to the LED part of the photo coupler Ph6, the MOSFET M3 is off. V1 is low down to setting voltage. When the positive input voltage is smaller than negative input voltage, the LED part of the photo coupler Ph6 is off, the MOSFET M3 is on. V1 gains to setting voltage. The on/off cycles keep the V1 in stable setting output. A negative logic can be applied on this embodiment and, but should not be limited to this embodiment.

Figure 15A:
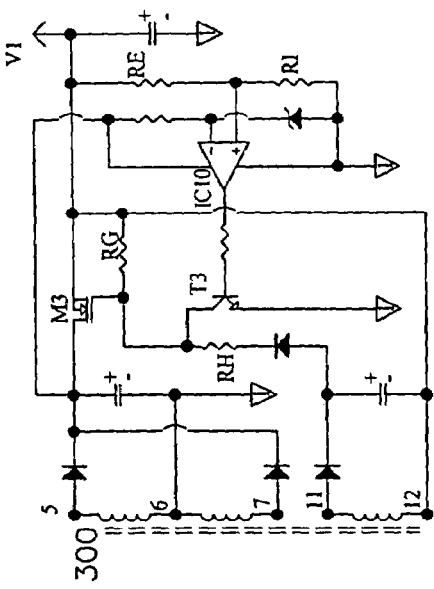
FIG. 15, an embodiment of DC power source circuit.
Figure 15B:
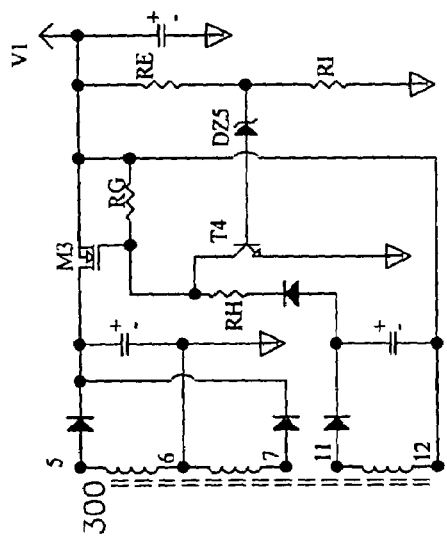
Figure 15C:
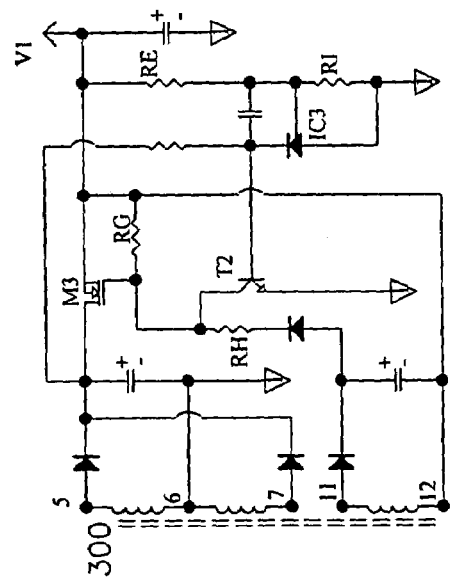

As shown in FIG. 15 (A), is an embodiment of DC power source circuit. The photo coupler Ph6 is replaced by a PNP transistor T2 in FIG. 5 of DC power source circuit 700. When the source voltage of the MOSFET M3 is higher than the setting voltage, V1, the IC3 is on, T2 is on, the gate voltage of M3 is low, M3 is off; the source voltage of the M3 is low to V1. When the source voltage of M3 is lower than V1, T2 is off, M3 is on; the source voltage of M3 is high to V1. Due to the above movement, the V1 is a stable output. As shown in FIG. 15 (B), is an embodiment of DC power source circuit. The photo coupler Ph6 is replaced by a NPN transistor T3 in FIG. 14 of DC power source circuit 700. The coupling way is a direct coupling which is different from photo coupling of FIG. 14. As shown in FIG. 5(C), is an embodiment of DC power source circuit. When the source voltage of M3 is higher than setting voltage V1, the voltage between RE and RI is higher than Zener voltage of ZD5 and the base-emitter voltage of T4, the T4 is on, M3 is off. When the source voltage of M3 is lower than setting voltage V1, the M3 is on. Due to the above movement, the V1 is a stable output.

As shown in FIG. 16 (A), is an embodiment of DC power source circuit. When the connection 8 of the secondary winding of the high frequency transformer 300 in positive half wave, the positive voltage passing through a limiting current resistor R8. Then the positive voltage passing through diode D1 to the LED of Ph9 to turn on the LED; the RH connected to the positive and the negative of the connection 11 and 12 of the secondary winding of the high frequency transformer 300 is short; The Gate of Power MOSFETs M5 is not positive voltage, thus the Power MOSFETs M5 is off. It means the Gate of the Power MOSFETs M4 is positive voltage, and the M4 is on. The MOSFET M5 is off; the MOSFET M4 is on. M4 and M5 have the characteristic of unidirectional; therefore, the circuit has rectifier function. When the junction B gets a rectified voltage, the V2 gets a DC voltage after flows through a π filter circuit composed by C3, L1, and C4. The center junction of RE and RI is connected to Reference of the Programmable Precision References IC, IC3, the other two junctions are connected to V2. When the V2 is greater than setting voltage, the IC3 is on, both M4 and M5 is off, the rectifying stops, the V2 is lower. When V2 goes low enough to turn the IC3 off, the M4 and M5 execute the rectifying function again, the V2 voltage is greater than it was. The M4 and M5 have the function of rectifying and regulation. The voltage of B junction could be higher than 8 and 10 connection of high frequency transformer 300 any time, to avoid this; a Protect opposite current detection circuit is applied in this invention. When the positive input of IC11 is greater than the negative one, the LED part of Ph12 is lit, the output of Ph12 is on, the power source is cut off, the emitter of the T4 is a zero voltage output, M4 and M5 cut off; therefore, no reversing voltage occurs on high frequency transformer 300. The D3 and D4 are diodes; they are set to give the instant voltage comes from connection 8 and 10 to the negative input of IC11. RL and RM are for setting voltage of positive input of IC11. The RN and RP are for setting voltage of negative input of IC 11.

As shown in FIG. 16 (B), is an embodiment of DC power source circuit with self starting function. When the positive half wave occurs on connection 8 of high frequency transformer 300, the sum of Zener voltage of DZ7, the forward bias voltage of D1, and the forward bias voltage of LED part of Ph9 has to be greater than voltage of junction B; then the circuit has the function of protect opposite current. If the voltage is greater than voltage of junction B, the LED part of Ph9 is lit, the output of the Ph9 is on, the positive voltage comes from connection 11 and 12 is on RH, M4 is on, the positive half wave voltage goes through M4 to the π filter composed by C3, L1, and C4; then it becomes to output voltage V2. When the positive half wave occurs on connection 10 of high frequency transformer 300, the execution is the same as the above. Both positive half wave of 8 and 10 are connected to junction B, thus is a full-wave rectifier. IC3, Programmable Precision References IC, is on, the output of the Ph6 is on, the gates of M4 and M5 is shorten, the V2 is lower than it was; when V2 drops until the IC3 is off, the M4 and M5 executes rectifying, the V2 is higher than it was. Instead of the Protect opposite current detection circuit, DZ7 and DZ8 can be removed out of the circuit. The M4 and M5 has characteristic of bidirectional; therefore, the Drain and source can be switch from each other and, but should not be limited to this embodiment, the gate circuit stays the same.

Figure 16A:
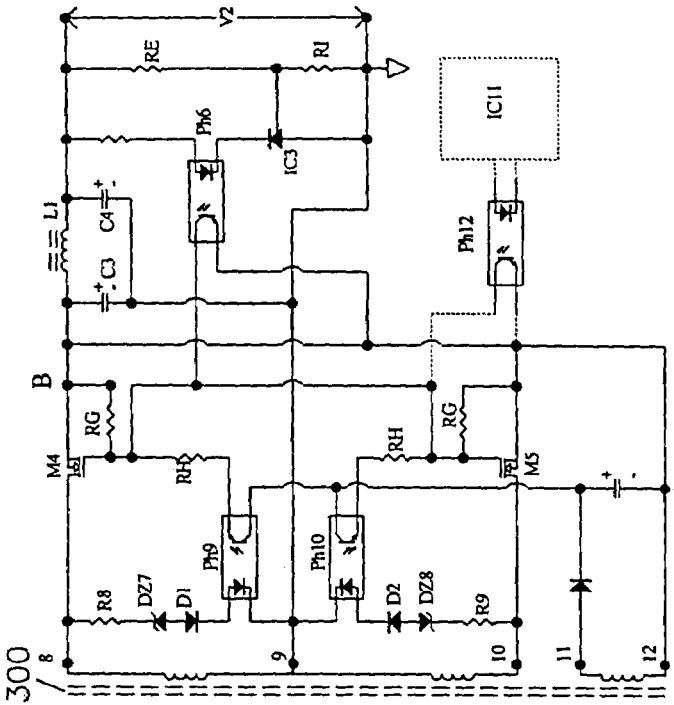
FIG. 16, an embodiment of DC power source circuit.
Figure 16B:
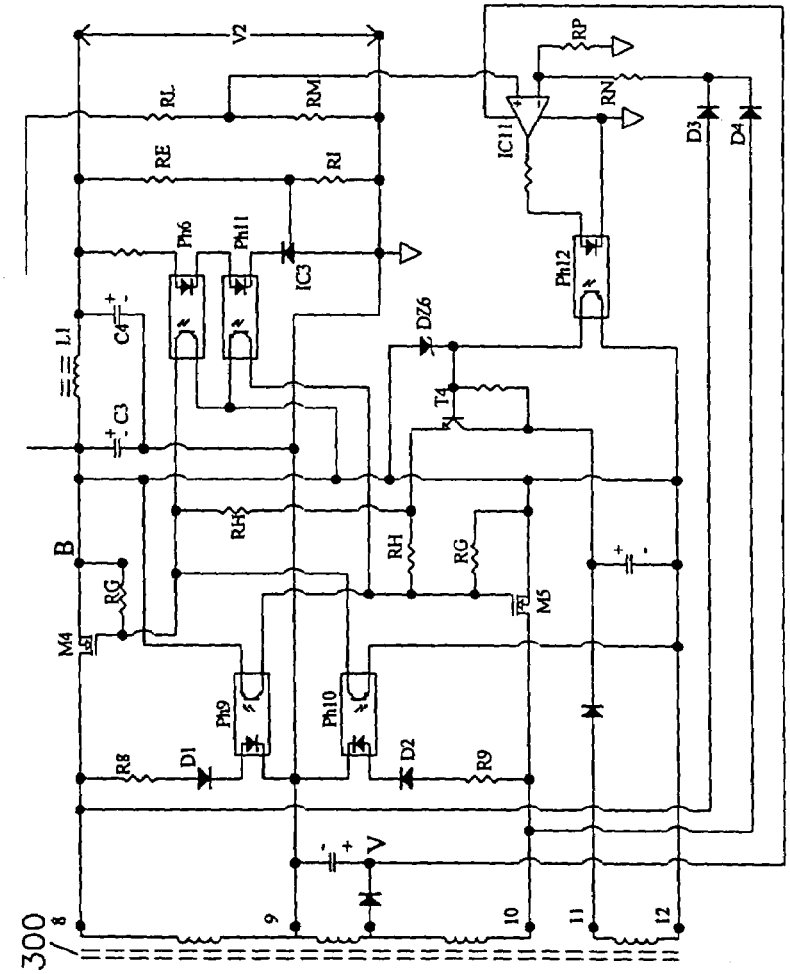
Figure 16D:
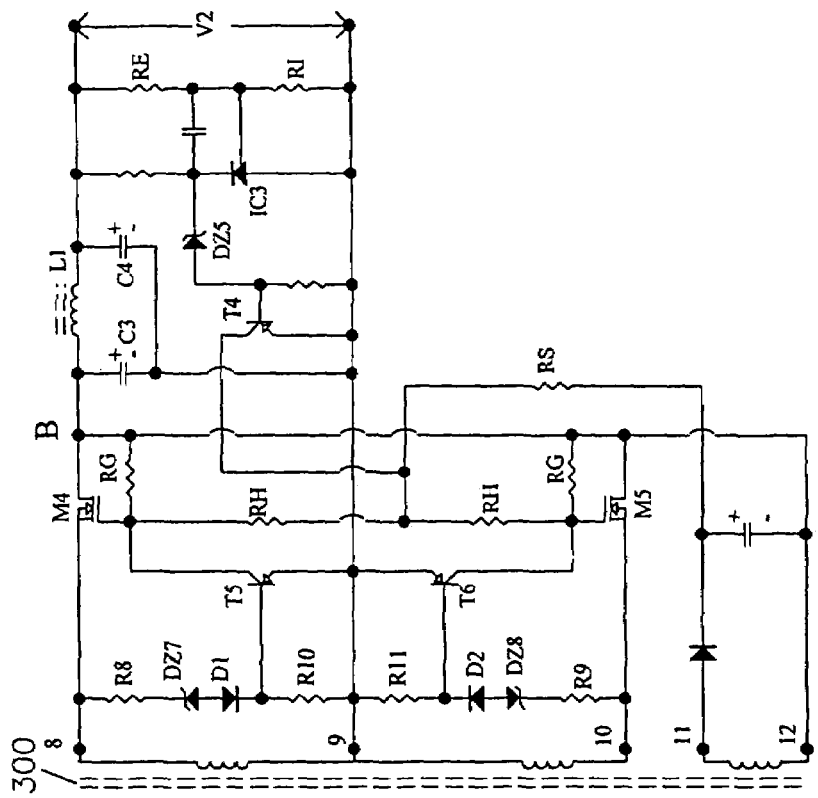
Figure 16C:
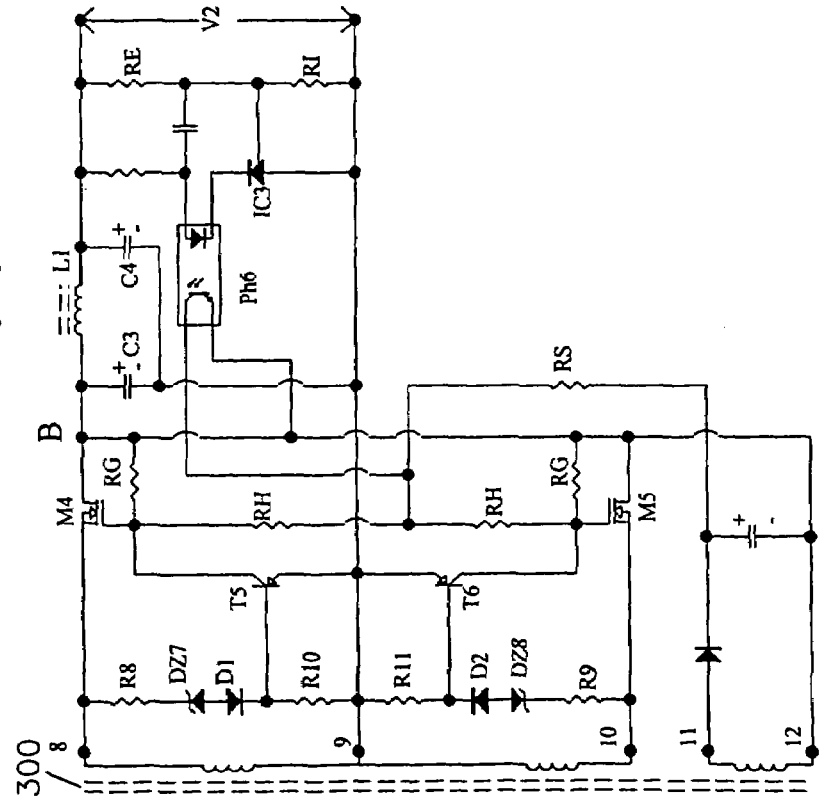

As shown in FIG. 16(C), is an embodiment of DC power source circuit with self starting function. When the positive half wave occurs on connection 8 of high frequency transformer 300, the sum of Zener voltage of DZ7, the forward bias voltage of D1, and the base voltage of T5 has to be greater than voltage of junction B; then the circuit has the function of protect opposite current. If the voltage is greater than voltage of junction B, T5 is on, the positive voltage comes from connection 11 and 12 is on RH, M4 is on, the positive half wave voltage goes through M4 to the π filter composed by C3, L1, and C4; then it becomes to output voltage V2. When the positive half wave occurs on connection 10 of high frequency transformer 300, the execution is the same as the above. Both positive half wave of 8 and 10 are connected to junction B, thus is a full-wave rectifier. IC3, Programmable Precision References IC, is on, the output of the Ph6 is on, the gates of M4 and M5 is shorten, the V2 is lower than it was; when V2 drops until the IC3 is off, the M4 and M5 executes rectifying, the V2 is higher than it was. The Power MOSFETs M4 and M5 have the function of rectifying and regulation. The sources of the MOSFETs are connected to the AC terminal in this circuit.

As shown in FIG. 16 (D), is an embodiment of DC power source circuit with self starting function. The Ph6 in FIG. 16 (C) is replaced with Zener Diode ZD5 and the PNP transistor T4. When the V2 is greater than the setting voltage, the IC3, Programmable Precision References IC works, the base of T4 is low voltage, the T4 is off, the gates of M4 and M5 are grounded; M4 and M5 stop rectifying, the V2 is dropped. When V2 is dropped to turn the IC 3 off, the M4 and M5 start rectifying; V2 rises. The Power MOSFETs M4 and M5 have the function of rectifying and regulation. The M4 and M5 has characteristic of bidirectional. The sources of the MOSFETs are connected to the AC terminal in this circuit. The Protect opposite current circuit is composed by Diodes D1 and D2, Zener Diodes DZ7 and DZ8, current limit resistors R8 and R9, base resistor R10 and R11, and PNP transistors T5 and T6 or same function MOSFETs. The Zener Voltage of ZD7 and ZD8 have to be equal or greater than DC output to prevent the opposite current and energy wasting. The Protect opposite current circuit of FIG. 16 (C) is same function as above. The M4 and M5 in FIGS. 16 (A), (B), (C), and (D) can be a rectifier and has the characteristic of low losses and substitutes rectifier Diodes. Ensemble with FIG. 5 and the DC power source 700 in FIG. 14 is a very practical application for industry.

Figure 17:
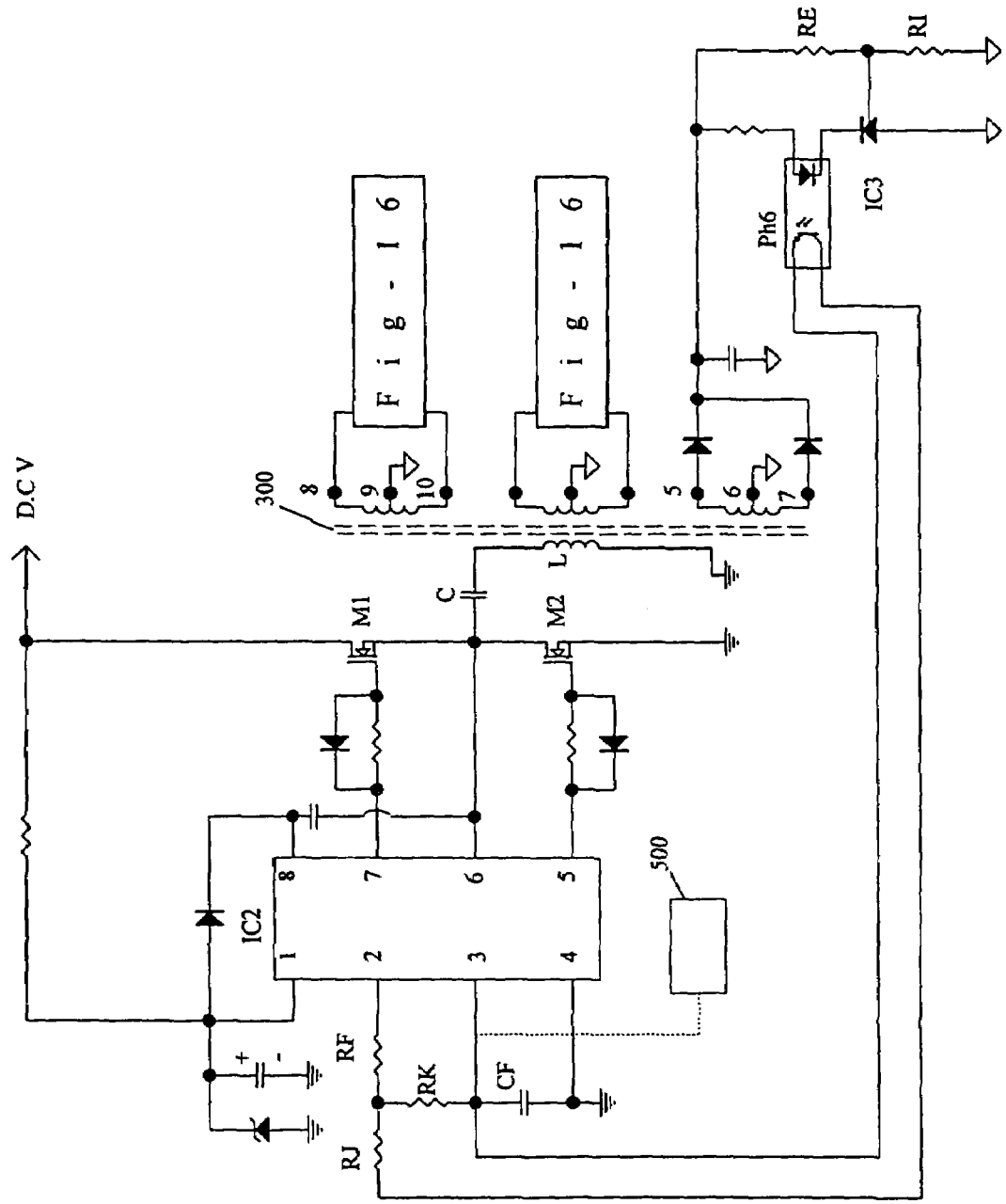
FIG. 17, an embodiment of DC power source circuit.

As shown in FIG. 17, is an embodiment of DC power source circuit. This circuit is composed by FIG. 4, FIG. 8, and FIG. 16. The frequency of IC2 is related to RF and CF. When self oscillating half bridge driver IC2 working, the secondary winding 5, 6, and 7 generates a high frequency voltage, after full wave rectifying and filtering, a setting voltage is got from the center junction of RE and RI. When the setting voltage is greater than 2.5V, Programmable Precision References IC3 is on, LED part of Ph6 is lit, the sum of RJ and RK is drop, the oscillating frequency is higher, the output voltage of secondary winding of high frequency transformer 300 is lower, the DC voltage output voltage is lower. When the DC voltage output is lower than setting voltage, the oscillating frequency of the IC3 is lower, the DC voltage output is greater; therefore, the DC voltage output becomes stable. The secondary winding 8, 9, and 10; secondary winding 5, 6, and 7 belong to same high frequency transformer 300; therefore, the DC voltage output of secondary winding 8, 9, and 10 is affected by DC voltage output of secondary winding 5, 6, and 7; this circuit gets stable DC voltage output and against the affection of impulse width control circuit 600. The control logic of this circuit can be positive and negative logic depended on application and L C harmonic curve and, but should not be limited.

This Invention is a power source device with VAM control method; an APFC circuit which the DC voltage output is controlled by positive and negative logic control, by controlling the amplitude of the high frequency power source circuit to achieve the brightness control of CCFL or EEFL lamps group; a impulse width control circuit to achieve brightness control of CCFL or EEFL lamps group; simultaneously get a high frequency output, multiple sets of stable DC voltage output from secondary winding; function of protect circuit includes open-circuited of discharge lamp, over current, over voltage.

What is claimed is:

1. A power source apparatus comprising
a high frequency power source circuit,
an impulse width control circuit,
a high frequency transformer and a DC power source;
the high frequency power source circuit including a self-oscillating half bridge driver or self-oscillating full bridge driver for generating oscillating frequency;
the impulse width control circuit including a plurality of an input of MOSFETs and a plurality of photo couplers connected to a capacitor from the self-oscillating half bridge driver or self-oscillating full bridge driver to control a variable impulse frequency;
the high frequency transformer having a primary winding and at least one secondary winding to supply a DC voltage output.

2. The power source apparatus as claimed in claim 1, further comprising an Active Power Factor Corrector (APFC) circuit supplying a high power factor source to the high frequency power source circuit.

3. The power source apparatus as claimed in claim 2, wherein the APFC circuit is a boost APFC circuit.

4. The power source apparatus as claimed in claim 2, wherein the DC voltage output of the APFC circuit controlled by a compensation resistor connecting in serial with an output of the plurality of the photo couplers and the compensation resistor connecting in parallel with both ends of a voltage division resistor.

5. The power source apparatus as claimed in claim 2, wherein the DC voltage output of the APFC circuit is controlled by positive or negative logic voltage so as to control brightness of a CCFL or EEFL lamps group.

6. The power source apparatus as claimed in claim 2, wherein the APFC circuit is controlled by positive or negative logic voltage, the positive or the negative logic voltage is from DC voltage of a source detection circuit having a ratio winding of a CCFL or EEFL lamps group.

7. The power source apparatus as claimed in claim 2, wherein the APFC circuit is controlled by positive or negative logic voltage, the positive or the negative logic voltage is from the DC voltage output of the DC power source.

8. The power source apparatus as claimed in claim 2, wherein the APFC circuit is controlled by positive or negative logic voltage, the positive or the negative logic voltage is from the DC power source or an external circuit to supply ideal voltage to a load.

9. The power source apparatus as claimed in claim 2, wherein a control coupling of the APFC circuit is a photo-coupling or a direct-coupling.

10. The power source apparatus as claimed in claim 1, wherein an oscillating frequency of the high frequency power source circuit is determined by an oscillation-related resistor RF and an oscillation-related capacitor CF.

11. The power source apparatus as claimed in claim 1, wherein the high frequency power source circuit includes the self-oscillating half bridge driver or the self-oscillating full bridge driver, sets of power MOSFETs, or at least one high frequency transformer.

12. The power source apparatus as claimed in claim 11, wherein the self-oscillating half bridge driver or the self-oscillating full bridge driver drives a plurality of power MOSFETs to transfer energy to one or a plurality of primary windings of the high frequency transformer.

13. The power source apparatus as claimed in claim 11, wherein the self-oscillating half bridge driver or the self-oscillating full bridge driver for driving one or a plurality of power MOSFETs to transfer energy to the primary windings of one or a plurality of the high frequency transformers.

14. The power source apparatus as claimed in claim 1, wherein the impulse width control circuit includes a Sawtooth Generator, DC voltage, OP Amplifier IC, a voltage comparator IC, and the photo coupler, having variable impulse frequency and variable impulse width, and controlling a frequency related capacitor or the input of MOSFETs by the photo coupler.

15. The power source apparatus as claimed in claim 1, wherein a voltage of the DC power source is controlled by a Programmable Precision References IC and a voltage divided circuit, the photo coupler stabilizing the DC voltage output by controlling frequency of the self-oscillating half bridge driver or the self-oscillating full bridge driver.

16. The power source apparatus as claimed in claim 1, further comprising a CCFL or EEFL lamps group supplied by a high voltage power source from a secondary winding of the high frequency transformer, each CCFL or EEFL lamp having an open circuit detection circuit to improve backlight quality of the lamps group.

17. The power source apparatus as claimed in claim 1, further comprising a protect circuit supplying a DC source from the DC power source protecting a CCFL or EEFL lamps group.

18. A power source apparatus comprising
a high frequency power source circuit,
an impulse width control circuit, and
a high frequency transformer;
the high frequency power source circuit including a self-oscillating half bridge driver or self-oscillating full bridge driver for driving a CCFL or EEFL lamps group;
the impulse width control circuit including a plurality of an input of MOSFET and a plurality of photo couplers connected to a capacitor from the self-oscillating half bridge driver or the self-oscillating full bridge driver for controlling a brightness of the CCFL or EEFL lamps group and generating oscillating frequency;
the high frequency transformer including a primary winding and a multiple of secondary windings for supplying a high voltage source and applying the multiple secondary windings to a DC power source.

19. The power source apparatus as claimed in claim 18, further comprising an Active Power Factor Corrector (APFC) circuit supplying a high power factor source to the high frequency power source circuit.

20. The power source apparatus as claimed in claim 19, wherein a DC voltage output of the APFC circuit is controlled by a compensation resistor connecting in serial with an output of the photo coupler and a compensation resistor connecting in parallel with both ends of a voltage division resistor.

21. The power source apparatus as claimed in claim 19, wherein a DC voltage output of the APFC circuit is controlled by positive or negative logic voltage so as to control the brightness of the CCFL or EEFL lamps group.

22. The power source apparatus as claimed in claim 19, wherein the APFC circuit is controlled by positive or negative logic voltage, the positive or the negative logic voltage is from a DC voltage of a source detection circuit having a ratio winding of the CCFL or EEFL lamps group.

23. The power source apparatus as claimed in claim 19, wherein the APFC circuit is controlled by positive or negative logic voltage, the positive or the negative logic voltage is from a DC voltage output of the DC power source to stabilize the DC voltage output.

24. The power source apparatus as claimed in claim 19, wherein the APFC circuit is controlled by positive or negative logic voltage, the positive or the negative logic voltage is from a DC power source or an external circuit to supply ideal voltage to a load.

25. The power source apparatus as claimed in claim 19, wherein a control coupling of the APFC circuit is an opto-coupling or a direct-coupling.

26. The power source apparatus as claimed in claim 19, wherein the self-oscillating half bridge driver or the self-oscillating full bridge driver for driving a plurality of power MOSFETs to transfer energy to one or a plurality of primary windings of the high frequency transformer.

27. The power source apparatus as claimed in claim 19, wherein the self-oscillating half bridge driver or the self-oscillating full bridge driver for driving one or a plurality of power MOSFETs to transfer energy to the primary windings of one or a plurality of high frequency transformers.

28. The power source apparatus as claimed in claim 19, wherein the APFC circuit is a boost APFC circuit.

29. The power source apparatus as claimed in claim 18, wherein an oscillating frequency of the high frequency power source circuit is determined by an oscillation-related resistor RF and an oscillation-related capacitor CF.

30. The power source apparatus as claimed in claim 18, wherein the high frequency power source circuit includes the self-oscillating half bridge driver or the self-oscillating full bridge driver, sets of power MOSFETs, or one or a plurality of high frequency transformers.

31. The power source apparatus as claimed in claim 18, wherein the impulse width control circuit includes a Sawtooth Generator, DC voltage, OP Amplifier IC, a voltage comparator IC, and the photo coupler, having variable impulse frequency and variable impulse width, and controlling the frequency related capacitor or the input of MOSFETs by the photo coupler.

32. The power source apparatus as claimed in claim 18, further comprising a protect circuit sourcing DC source from the DC power source to protect the CCFL or EEFL lamps group.

33. A power source apparatus comprising:
an Active Power Factor Corrector (APFC) circuit having an Electro-Magnetic Interference Filter (EMIF) in front of the APFC circuit, the EMIF being controlled by the APFC circuit;
a high frequency transformer having a primary winding and a plurality of secondary windings, the high frequency transformer supplying high frequency high voltage source to supply a CCFL or EEFl lamps group, and the plurality of secondary windings supplying the DC power source;
a high frequency power source circuit generating oscillating frequency and a driving signal to provide the primary winding of the high frequency transformer, including a self-oscillating half bridge driver or a self-oscillating full bridge driver, depending on a requirement of the CCFL or EEFL lamps group;
an impulse width control circuit controlling a frequency of a pulse and a width of the pulse, applying an output of a photo coupler to control an oscillation frequency related capacitor of the self-oscillating half bridge driver, the oscillation frequency related capacitor of the self-oscillating full bridge driver, or an input of MOSFETs to control a brightness of the CCFL or EEFL lamps group;
the CCFL or EEFL lamps group being supplied by a high voltage power source from the secondary windings of the high frequency transformer, each one of the CCFL or EEFL lamps group connecting to an open circuit detection circuit;
a DC power source sourcing from a plurality of high frequency sources of the high frequency transformer;
a protect circuit sourcing DC source from the DC power source to protect the CCFL or EEFL lamps group; and
an I/O Interface device including multiple sets of DC voltage output and one or a plurality of DC voltage inputs to control brightness of the CCFL or EEFL lamps group or voltage of a DC load.

34. The power source apparatus as claimed in claim 33, wherein the DC voltage output of the APFC circuit is controlled by a compensation resistor connecting in serial with an output of the photo coupler, and a compensation resistor connecting in parallel with both ends of a voltage division resistor.

35. The power source apparatus as claimed in claim 33, wherein the oscillating frequency of the high frequency power source circuit is dependent on an oscillating frequency related resistor RF and an oscillating frequency related capacitor CF, the oscillating frequency is fixed and not varied with load.

36. The power source apparatus as claimed in claim 33, wherein the oscillating frequency of the high frequency power source circuit is determined by an oscillation-related resistor RF and an oscillation-related capacitor CF.

37. The power source apparatus as claimed in claim 33, wherein the APFC circuit is controlled by positive or negative logic voltage, the positive or the negative logic voltage is from a DC voltage of a source detection circuit having a ratio winding of the CCFL or EEFL lamps group.

38. The power source apparatus as claimed in claim 33, wherein the DC voltage output of the APFC circuit is controlled by positive or negative logic voltage so as to control the brightness of the CCFL or EEFL lamps group.

39. The power source apparatus as claimed in claim 33, wherein the APFC circuit is controlled by positive or negative logic voltage, the positive or the negative logic voltage is from the DC power source or an external circuit to supply voltage to a load.

40. The power source apparatus as claimed in claim 33, wherein a control coupling of the APFC circuit is an opto-coupling or a direct-coupling.

41. The power source apparatus as claimed in claim 33, wherein the open circuit detection circuit connected to each CCFL or EEFL lamp is an AC Input Response type photo coupler, an input of the AC Input Response connecting in serial with a CCFL, EEFL lamp, or high frequency capacitor, and connecting in parallel with the high frequency transformer, and an output of the AC Input Response is in a serial connection.

42. The power source apparatus as claimed in claim 33, wherein the high frequency power source circuit includes the self-oscillating half bridge driver or the self-oscillating full bridge driver, sets of power MOSFETs or one or a plurality of high frequency transformers.

43. The power source apparatus as claimed in claim 42, wherein the self-oscillating half bridge driver or the self-oscillating full bridge driver for driving a plurality of power MOSFETs to transfer energy to one or a plurality of the primary windings of the high frequency transformer.

44. The power source apparatus as claimed in claim 42, wherein the self-oscillating half bridge driver or the self-oscillating full bridge driver for driving one or a plurality of power MOSFETs to transfer energy to the primary winding of one or a plurality of the high frequency transformers.

45. The power source apparatus as claimed in claim 33, wherein the impulse width control circuit includes a Sawtooth Generator, DC voltage, OP Amplifier IC, a voltage comparator IC, and the photo coupler, having variable impulse frequency and variable impulse width, and controlling the frequency related capacitor or the input of MOSFETs by the photo coupler so as to control the brightness of the CCFL or EEFL lamps group.

46. The power source apparatus as claimed in claim 33, wherein a Voltage Amplitude Method (VAM) circuit and the impulse width control circuit are used simultaneously and independently to control the brightness of the CCFL or EEFL lamps group and the DC power source.

* * * * *

UNITED STATES PATENT AND TRADEMARK OFFICE
CERTIFICATE OF CORRECTION

PATENT NO. : 7,619,368 B2  Page 1 of 1
APPLICATION NO. : 11/175349
DATED : November 17, 2009
INVENTOR(S) : Chao-Cheng Lu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Twenty-sixth Day of October, 2010

David J. Kappos
*Director of the United States Patent and Trademark Office*